United States Patent
Seong et al.

(10) Patent No.: US 9,091,899 B2
(45) Date of Patent: Jul. 28, 2015

(54) LIGHT-CONTROLLING DEVICE AND METHOD OF MANUFACTURING THE SAME

(71) Applicant: LG Display Co., Ltd., Seoul (KR)

(72) Inventors: MiRyn Seong, Paju-si (KR);
YoungHoon Noh, Paju-si (KR); Moon Sun Lee, Sejong (KR)

(73) Assignee: LG Display Co., Ltd., Seoul (KR)

( * ) Notice: Subject to any disclaimer, the term of this patent is extended or adjusted under 35 U.S.C. 154(b) by 23 days.

(21) Appl. No.: 14/100,506

(22) Filed: Dec. 9, 2013

(65) Prior Publication Data

US 2014/0160552 A1 Jun. 12, 2014

(30) Foreign Application Priority Data

Dec. 12, 2012 (KR) .......................... 10-2012-0144974

(51) Int. Cl.
*G02B 26/00* (2006.01)
*G02B 26/08* (2006.01)
*G02F 1/167* (2006.01)

(52) U.S. Cl.
CPC .......... *G02F 1/167* (2013.01); *G02F 2001/1676* (2013.01); *Y10T 29/49117* (2015.01)

(58) Field of Classification Search
USPC ................................................. 359/290–298
See application file for complete search history.

(56) References Cited

U.S. PATENT DOCUMENTS

| | | | |
|---|---|---|---|
| 5,204,772 A * | 4/1993 | Hirata et al. .................. | 359/296 |
| 2001/0030639 A1 | 10/2001 | Goden | |
| 2004/0239613 A1 | 12/2004 | Kishi | |
| 2010/0060623 A1* | 3/2010 | Van Delden et al. ......... | 345/211 |
| 2012/0154898 A1* | 6/2012 | Kwon et al. .................. | 359/296 |

FOREIGN PATENT DOCUMENTS

| | | |
|---|---|---|
| JP | 2007-017735 A | 1/2007 |
| JP | 2010-262007 A | 11/2010 |

OTHER PUBLICATIONS

English Translation of JP 2010-262007, Nov. 18, 2010.
International Search Report, Sep. 17, 2014.
English Translation of JP 2007-017735, Jan. 25, 2007.

* cited by examiner

*Primary Examiner* — Mohammed Hasan
(74) *Attorney, Agent, or Firm* — Novak Druce Connolly Bove + Quigg LLP

(57) ABSTRACT

The light-controlling device includes a first substrate, a second substrate and a partition wall separating the first and second substrates to define a cell. A light-adjustment medium containing a plurality of charged particles is disposed between the first and second substrates. One of the first electrode on the first substrate and the second electrode on the second substrate covers lesser area of the light-controlling device than the other electrode. The electrode covering lesser area of the light-controlling device may have grooved surface to increase the surface area without increasing the overall area of the light-controlling device covered by the electrode. Particle guidance member can be used to create a reservoir for holding increased amount of charged particles on the electrode covering lesser area of the light-controlling device.

20 Claims, 16 Drawing Sheets

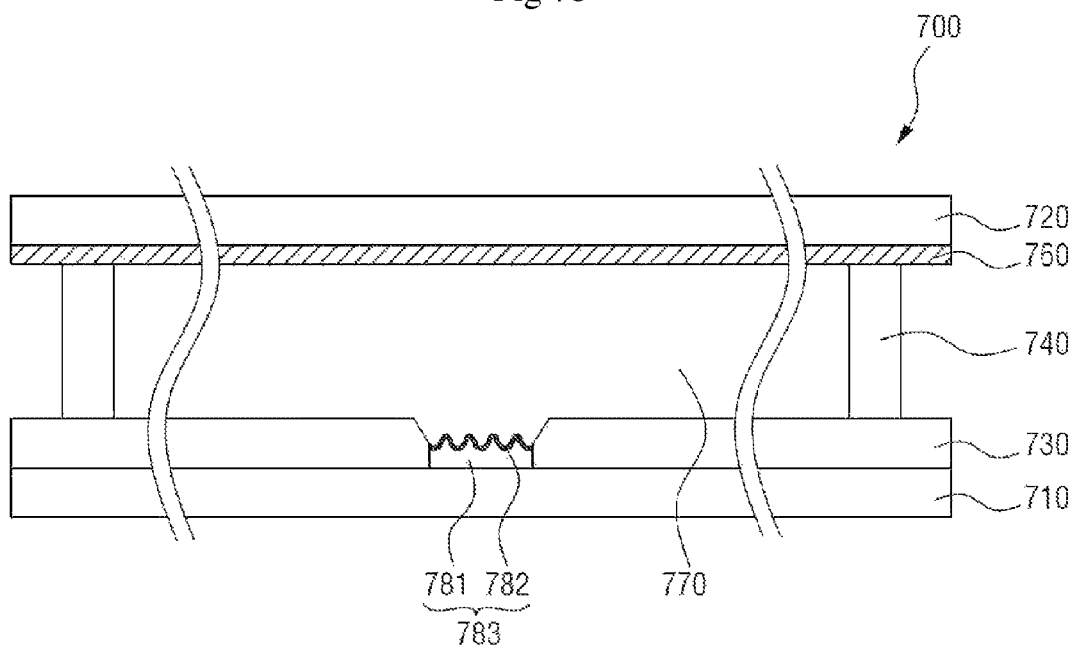

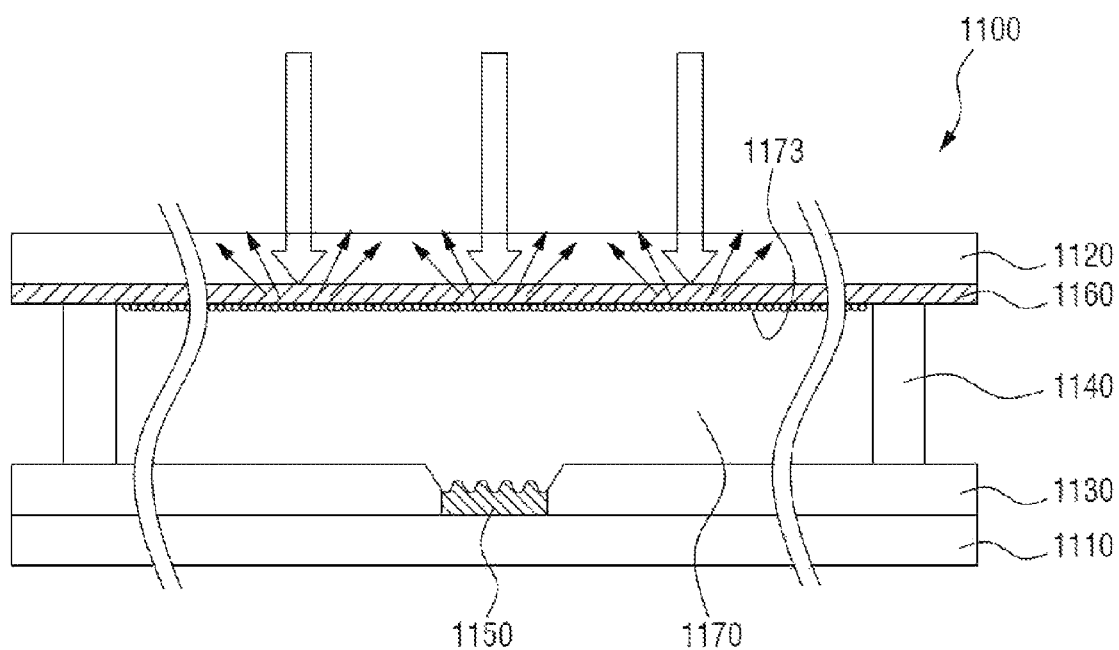

(a)

(b)

(c)

(a)

(b)

(c)

LIGHT-CONTROLLING DEVICE AND METHOD OF MANUFACTURING THE SAME

CROSS-REFERENCE TO RELATED APPLICATION

This application claims priority to and the benefit of Korean Patent Application No. 2012-0144974, filed on Dec. 12, 2012, the disclosure of which is incorporated herein by reference in its entirety.

BACKGROUND

1. Field of the Invention

The present invention relates to a light-controlling device, and more particularly, to a light-controlling device with increased light transmittance and a shielding rate, and method of increasing the light transmittance and shielding rate in such a light-controlling devices.

2. Discussion of Related Art

Research has been conducted on a light-controlling device that may be applied to windows, automobiles, airplanes, optical devices, or image display devices to control light transmittance or reflectance. The light-controlling device may block, reflect, scatter, or transmit light in an ultraviolet (UV) region, a visible light region, or a near-infrared (NIR) region due to the characteristics and movements of various kinds of charged elements.

When the light-controlling device is applied to, or otherwise used as, windows of buildings or automobiles, the light-controlling device can control the transparency of the window to adjust the amount of light entering through the window. For example, the light-controlling device can be used to adjust the sunlight entering through the window to control the indoor temperature and brightness, and provide energy efficient environment.

For most applications, both light transmittance rate and light shielding rate are important aspects of the light-controlling device. These properties, however, generally have a trade-off relationship with each other, and therefore it is often difficult to achieve both the high light transmittance and the high shielding rates at the same time. Attempts have been made by using polymer disperse liquid crystal (PDLC) having a varied light intensity, but it still lacks sufficient light transmittance and/or light shielding properties in many applications.

Accordingly, there is still a need for a light-controlling device capable of providing both high transmittance and a high shielding rate.

SUMMARY OF THE INVENTION

Accordingly, an aspect of the present disclosure relates to an improved light-controlling device. The light-controlling device includes a first substrate, a second substrate and a partition wall separating the first and second substrates to define a cell. In between the first substrate and the second substrate, a light-adjustment medium is disposed. The light-adjustment medium contains a plurality of charged particles, which may any one of a plurality of light-absorbing particles, a plurality of light-reflecting particles and a plurality of light-scattering particles. Further included in the light-controlling device are a first electrode and a second electrode. The first electrode is disposed on the first substrate to cover at least some part of the first substrate within the cell. The second electrode is disposed on the second substrate to cover at least some part of the second substrate within the cell. The first and second electrodes have different size. By way of an example, the first electrode may smaller size (i.e., length and width) than the second electrode such that the area of the first substrate covered by the first electrode within the cell is smaller than the area of the second substrate covered by the second substrate within the cell. In an embodiment, the first electrode within the cell covers about 0.1% to 10% of the total area of the first substrate enclosed within the cell.

In some embodiments, the first electrode has a grooved surface with a projection of a first height and a recess with a first depth. Also, the diameter of each of the charged particles may be less than the first height and less than the first depth of the grooved surface. The grooved surface increases the total surface area of the first electrode while maintaining the size of the area on the first substrate being covered by the first electrode. The increased surface area of the first electrode allows for gathering and holding an increased amount of charged particles in comparison to the first electrode having a flat surface. Accordingly, the total amount of charged particles (e.g., concentration of the charged particles in the light-adjustment medium) in the device can be increased to maximize the light shielding property during the shielding mode without negatively affecting the light transmittance of the device during the transmissive mode.

In some embodiments, the light-controlling device includes one or more particle guidance members that are thicker (in vertical direction) and are configured to create a hollow space over the first electrode. Some portion or the entire portion of the first electrode exposed through the hollow space, serving as the surface defining the bottom of the hollow space. In cases where there is a single first electrode and a hollow space within each cell, the volume of the hollow space formed on the first electrode is substantially the same or greater than the total volume of the charged particles within the cell. In cases where multiple first electrodes with hollow spaces are disposed within each cell, the total volume of the multiple hollow spaces is substantially the same or greater than the total volume of the charged particles within the cell. Without this hollow space on the first electrode, the charged particles tend to be collected widely around the first electrode, thereby affecting (e.g., blocking, reflecting, scattering) the light passing through larger area of the device even during the transmissive mode. Lesser amount of the charged particles can be employed within the cell so that lesser area is affected the charged particles during the transmissive mode, but the reduced amount of the charged particles may reduce the effectiveness of the light-controlling device during the light shielding mode. By forming the hollow space on the first electrode, however, the charged particles within the cell can be stacked on each other and be collected within the relatively narrow hollow space without having to use lesser amount of the charged particles within the cell. In other words, the amount of the charged particles within the cell can be maintained or even be increased without having to worry about the performance of the light-controlling device in both the light transmissive mode and the light shielding mode.

In some embodiments, the hollow space is tapered such that its opening towards the second substrate is larger than the opening towards the first substrate. The larger opening towards the opposing substrate makes it easier for the charged particles to be drawn into the hollow space during when the first electrode is activated to pull the charged particles. For example, the hollow space may have sidewalls that extend at an angle of about 40° to about 80° toward the second substrate. In some embodiments, the particle guidance member has an angled surface that slopes towards the hollow space, which further aids the charged particles to move towards the hollow space when the first electrode is activated to pull the charged particles.

The hollow space can be formed in a variety of ways by employing one or more of the particle guidance members. In some embodiments, a particle guidance member may have a hole, which extends through the particle guidance member towards the first electrode, thereby forming the hollow space over the first electrode to expose at least some portion of the first electrode. In some embodiments, multiple particle guidance members can be used. For example, a first particle guidance member can be disposed on one side (e.g., left) of the first electrode whereas a second particle guidance member can be disposed on other side (e.g., right) of the first electrode. Since the particle guidance members are thicker than the first electrode, the hollow space is formed on the first electrode positioned between the two particle guidance members. The side surfaces of the first and second particle guidance members and the upper surface of the first electrode defines the hollow space. The number of particle guidance members and their thickness can be adjusted depending on the desired shape and size of the hollow space. The ability of the particle guidance member to direct or otherwise guide the charged particles towards the first electrode and the size of the reservoir (e.g., hollow space) for holding the charged particles may vary depending on the application of the light-controlling device, the amount of the charged particles employed by the device as well as the amount of the charged particle to be held within the reservoir. For instance, the functionality of the particle guidance member and the reservoir can be adjusted by using the shape and dimension (e.g., angle, length, width, depth, etc.) of the particle guidance member, the tapered side wall, the first electrode, as well as the grooves of the first electrode.

In an aspect, the present invention is directed to a light-controllable window. The light-controllable window includes a first transparent substrate having a collecting electrode, a second transparent substrate having a spreading electrode, and a light-adjustment medium containing a plurality of charged particles disposed between the first substrate and the second substrate. The collecting electrode and the spreading electrode are configurable to create electric field between the first and second substrates to cause movement of the charged particles dispersed in the light-adjustment medium. The light-controllable window further includes one or more particle guidance members that are arranged to form a hollow space that encloses the collecting electrode with an opening towards the light-adjustment medium.

In yet another aspect, a method for manufacturing the light-controlling device is disclosed. In an exemplary method, a first electrode is formed on the first substrate and a second electrode is formed on the second substrate. The second electrode is larger than the first electrode so that, when the light-controlling device is viewed normally (i.e., perpendicular to the first substrate or the second substrate), relatively larger area is covered by the second electrode than the area of the light-controlling device covered by the first electrode. The method further includes forming at least one particle guidance member on the first substrate to form a hollow space that exposes at least some portion of the first electrode. Then, a light-controlling medium with a plurality of charged particles is sealed between the first and the second substrate.

Aspects of the present invention should not be limited by the above description, and other unmentioned aspects will be clearly understood by one of ordinary skill in the art from exemplary embodiments described herein.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIGS. 7A and 7B are cross-sectional views of a light-controlling device according to various exemplary embodiments of the present invention;

FIGS. 9, 10, 11A, and 11B are cross-sectional views of light-controlling devices according to various exemplary embodiments of the present invention;

DETAILED DESCRIPTION OF EXEMPLARY EMBODIMENTS

Figure 1:
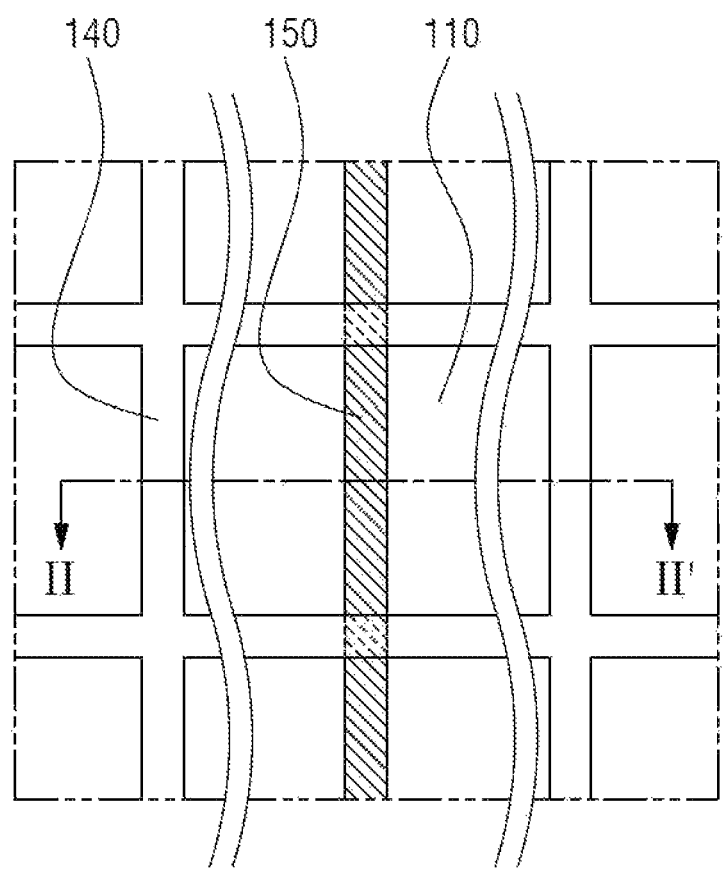
FIG. 1 is a plan view of a light-controlling device according to an exemplary embodiment of the present invention.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. It should be understood that the dimensions of the elements shown in the drawings may have been exaggerated for easier explanation of the embodiments and are not intended to limit the scope of the present invention.

An element or layer formed "on" another element or layer includes all a case in which an element is directly formed on another element, and a case in which an element is formed on another element with an additional element or layer formed therebetween. Although the terms first, second, etc. may be used to describe various elements, it should be understood that these elements are not limited by these terms. These terms are only used to distinguish one element from another. For example, a first element could be termed a second element, and, similarly, a second element could be termed a first element, without departing from the scope of exemplary embodiments.

In the present disclosure, a light-controlling device refers to a device configured to change the path or characteristics of light by controlling particles capable of absorbing, reflecting and/or scattering the light. For example, the light incident to the light-controlling device may be transmitted through the light-controlling device on certain condition, while the light is scattered, reflected or absorbed by the particles on some other conditions, thereby blocking or adjusting the light through the light-controlling device as well as displaying images on the light-controlling device. In the present disclosure, the light-controlling device may be synonymous with an active shielding layer, an electric shutter device, an active light-shielding layer, or a light-transmittance controlling device.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 2:
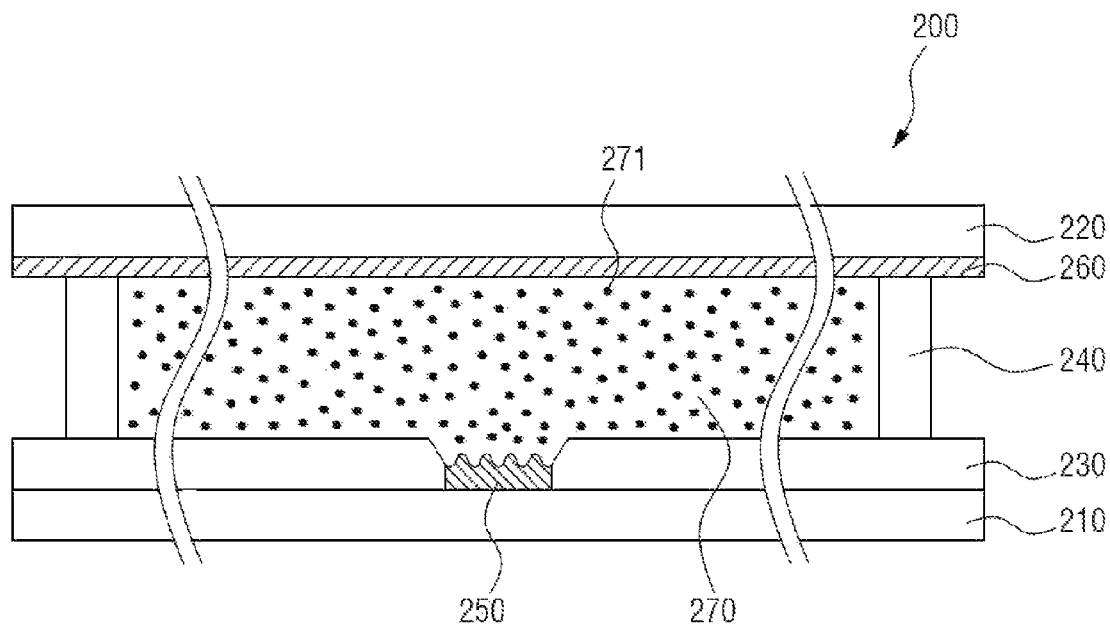
FIGS. 2 through 4 are cross-sectional views of the light-controlling device, which are taken along line II-II' of FIG. 1.
Figure 3:
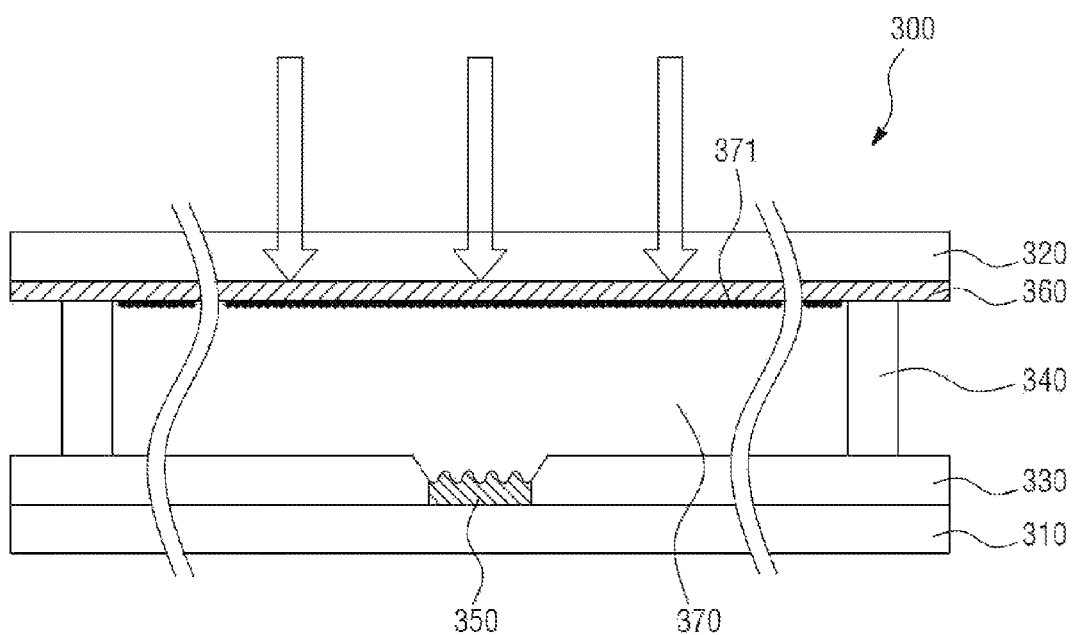
Figure 4:
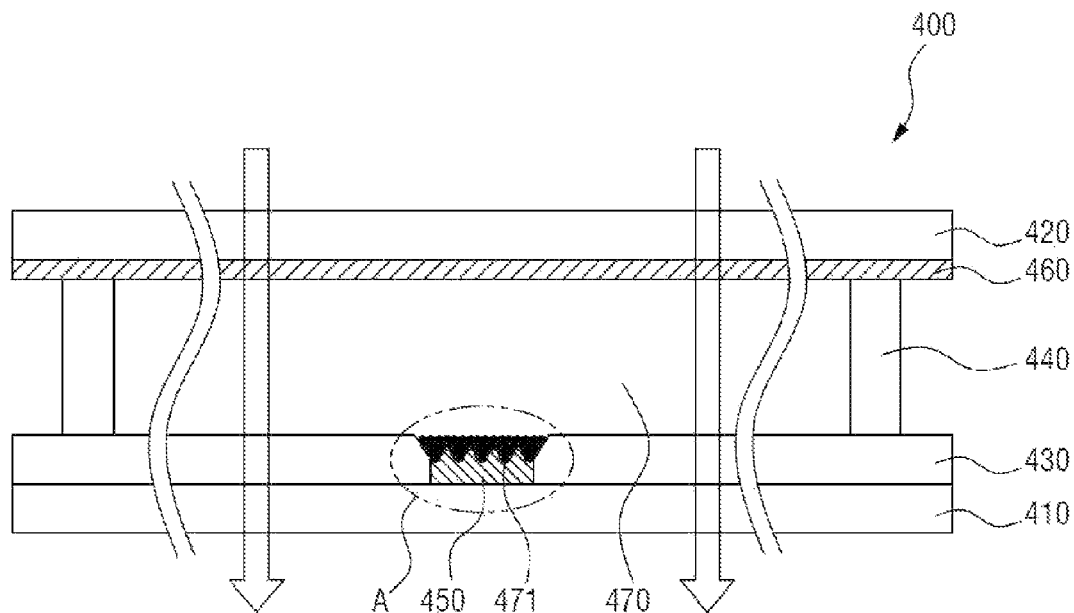

FIG. 1 is a plan view of an exemplary light-controlling device 100 according to an embodiment of the present invention, and FIGS. 2 through 4 are cross-sectional views of the light-controlling device 100, which are taken along line II-II' of FIG. 1.

As shown in FIG. 1, a cell 110 may refer to a unit region defined by the partition wall 140 in such a way that each cell 110 is separated from other unit regions in the light-controlling device 100. Although the cell 110 is illustrated as a rectangular shape in FIG. 1, it should be appreciated that the cell 110 may be defined in other shapes, for example a tetragonal shape, a hexagonal shape, a polygonal shape, a circular shape and various other shapes.

Also, in the example shown in FIG. 1, the electrode 150 has a rectangular shape and extends in a single direction. However, the shape and configuration of the electrode 150 is not limited as illustrated in FIG. 1. That is, the electrode 150 may extend to any direction within the cell 110, for example, in a widthwise direction or in a diagonal direction. Further, the electrode 150 may be formed to have a bent line shape or a curved shape, or formed to have a regular/irregular patterns. The shape and size of the cell 110 and the electrode 150 may vary depending on the application of the light-controlling device 100 so as to maximize transmittance. Furthermore, the number of electrode 150 in the cell 110 is not limited to one, but each cell 110 may include a plurality of electrodes 150 to increase the efficiency in creating the necessary force for gathering or collecting the particles to desired locations within the cell 110.

FIG. 2 illustrates an exemplary embodiment of the light-controlling device 200 (100 of FIG. 1). As shown, each cell 110 of the light-controlling device 200 may include a first substrate 210, a second substrate 220, a first electrode 250 (150 of FIG. 1) formed on the first substrate 210, a second electrode 260 formed on the second substrate 220, a plurality of charged particles 271, and a particle guidance member 230 formed on the first substrate 210.

The first substrate 210 and the second substrate 220, which are disposed opposite to each other, may be substrates that are configured to support several elements of the light-controlling device 200. The first substrate 210 and the second substrate 220 may be disposed in an upper portion or lower portion of the light-controlling device 200, respectively, and they may be referred to as a support member, a support substrate, or a backplane. The substrates may include an insulating material, for example, glass, plastic and various materials.

In some embodiments, the first substrate 210 and the second substrate 220 may be formed with different materials depending on the required light-controlling functions of the light-controlling device 200. When the light-controlling device 200 is used in an application requiring transmitting light through the device 200, the first substrate 210 and the second substrate 220 is be formed of a light-transmissive material such as transparent plastics and/or glass.

In some embodiments, a reflection reducing layer may be further provided on the first and second substrates 210 and 220. The reflection reducing layer may refer to a layer configured to prevent incident light from being reflected by an interface between two media having different refractive indices, and allow the incident light to be transmitted through or absorbed in the interface. The reflection reducing layer may be configured to reduce reflection of light due to a difference in refractive index between a substrate and the air. The reflection reducing layer may include any film or layer having a refractive index between the refractive index of the substrate and a refractive index of adjacent material (e.g., the air). For example, the reflection reducing layer may include a single crystalline silicon reflection reducing layer, a polycrystalline silicon reflection reducing layer, a dielectric nano reflection reducing layer, or an anti-glare coating layer, an anti-reflection film, or a low-reflection (LR) coating layer formed of polyethylene terephthalate (PET), polymethyl methacrylate (PMMA), or polycarbonate (PC).

Further, when the light-controlling device 200 is a flexible light-controlling device, the first substrate 210 and the second substrate 220 may be formed of a flexible material. Here, not only polyimide (PI), but also polyether imide (PEI) or polyethylene terephthalate (PET) may be used as the flexible material.

The first electrode 250 may be a conductive structure formed on the first substrate 210. The first electrode 250 may be referred to as a first electrode structure, a first light-controlling electrode, or a first electrode stack structure. Also, since the first electrode 250 functions to collect charged particles in a relatively narrow region than the second electrode 260, the first electrode 250 may be referred to as a collecting electrode. The first electrode 250 may be formed of a transparent conductive material or a conductive metal material. For instance, the first electrode 250 may be formed of a material, such as indium tin oxide (ITO), indium zinc oxide (IZO), carbon nanotubes (CNTs), graphene, or poly(3,4-ethylenedioxythiophene) poly(styrenesulfonate) (PEDOT:PSS). The first electrode 250 may also be formed of a metal, such as chromium (Cr), molybdenum (Mo), silver (Ag), aluminum (Al), copper (Cu), magnesium-silver (MgAg), magnesium-calcium (MgCa), aluminum-silver (AlAg), ytterbium-silver (YbAg), or nano-Ag, or a plurality of metal materials other than the above-described metal materials.

A surface of the first electrode 250 may be surface-treated to have a wrinkled surface to expand the surface area of the first electrode 250. Various types of surface processing methods may be employed to form the wrinkled surface on the first electrode 250 or otherwise increase the surface area of the electrode 250. The surface process may include performing a texturing process to increase surface area by forming a buckling structure, grooves, wrinkles, bucklings, or protuberances on the first electrode 250. The texturing process may refer to forming grooves on the surface of the electrode 250. Also, the texturing process may refer to alternately forming protrusions and recesses on the surface of the electrode 250.

As shown in FIG. 2, the first electrode may have repeating pattern of a plurality of grooves. Although the first electrode 250 is illustrated in FIG. 2 with perfectly repeating grooves formed thereon, it should be appreciated that the grooves of the first electrode 250 may have random order of various other shapes, such as tetragonal sectional shapes and/or tapered sectional shapes.

Buckling refers to lateral displacement, which occurs when the electrode 250 is applied with predetermined force or more in an axial direction and bent in a lateral direction. The buckling structure may include any surface shape that may be formed due to buckling. The buckling structure may include grooves. A plurality of grooves formed on the surface-treated electrode 250 may be irregularly generated.

As will be described in further detail below, the charged particles 271 may be collected on the surface or substantially near the electrode 250 so that the light incident to the light-controlling device 200 may be transmitted through the light-controlling device 200 without being affected by the particles 271. Conversely, when the charged particles 271 are not collected by the first electrode 250 (e.g., floating in between the substrates, adhered adjacent to the second substrate), the light may be absorbed or scattered by the charged particles 271, thereby altering the transmittance of the light through the light-controlling device 200.

To increase the number of the charged particles 271 collected by the first electrode 250, the width of the first electrode 250 may be increased. In this case, however, the aperture ratio of the cell 110 as well as the light-controlling device 200 may be reduced leading to a reduction the light passing through the light-controlling device 200. On the other hand, assuming the concentration of the particles 271 remains the same, reducing the width of the first electrode 250 may not provide sufficient surface area for collecting the particles 271. In such case, the particles 271 may be collected not only on the surface of the electrode 250 but also on a substrate disposed around the electrode 250, and may degrade the transmittance of light. As mentioned above, one way of collecting more number of charged particles 271 without increasing the area of the first electrode 250 is by expanding the surface area of the first electrode 250. Because of the wrinkled surface (protrusions/recessions), the surface of the electrode 250 facing the particles can have greater surface area than its opposite surface.

As such, in some embodiments, a plurality of grooves is formed on the surface of the electrode 250 to contain at least one charged particle 271 between the plurality of grooves. That is the interval (distance) between the projections and interval between the depressions may be greater than the diameter of the charged particles 271 so that one or more charged particles 271 can be held between the two projections. The distance between the projections and/or depressions may range from about 10 nm to about 10 μm. Further, the difference in the height between the projection and depression may be about 10 nm to about 10 μm, and may vary depending on the height of the cell 110.

When multiple first electrodes 250 are used in a cell 110, the interval between the first electrodes 250 may depends not only based on the ability to enable the light-controlling device 200 to control incident light but may also depends on the required transmittance and shielding rate of the light-controlling device 200. As such, in some embodiments, the interval between the electrodes 250 may range from about 10 μm to about 100 μm. When the interval between the electrodes 250 is excessively small, transmittance may be degraded in the transmission mode of the later-described driving method. When the interval between the electrodes 250 is excessively large, sufficient electric field for collecting the charged particles 271 may not be formed, so that it may be difficult to control incident light.

The width of first electrode 250 "W" may range from about 1 μm to about 10 μm. The width of the electrode 250 may be determined based on the force required by the light-controlling device 200 to control incident light. It may also be determined based on the transmittance requirement of the light-controlling device 200. For instance, sufficient electric field may not be formed to attract the charged particles 271 with an electrode having excessively small width. Also, such an electrode may also have increased resistance, which may make it difficult to drive the light-controlling device 200. Conversely, when the electrode 250 has an excessively large width, the overall transmittance of the cell 110 as well as the light-controlling device 200 may be reduced.

As described above, the electrode 250 may be disposed to occupy a predetermined region of the cell 110. The area covered by the electrode 250 in a cell 110 may be from about 0.1 to 10% with respect to the total area of one cell 110, and may depend on the above-described width of the electrode 250 and interval between the electrodes 250. As previously mentioned, it may be difficult to form a sufficient electric field for controlling the charged particles 271 if the area of the electrode 250 is equal to or smaller than about 0.1% of the area of the cell 110. Conversely, the light transmittance of the light-controlling device 200 may be reduced by the area occupied by the electrode 250 in the cell 110, albeit it may be easy to control the charged particles 271 with the electrode 250 occupying larger area (e.g., equal or greater than 10% of total area of the cell). Accordingly, in an application where faster driving speed is preferred over the overall light transmittance of the light-controlling device, the electrode 250 may be formed to have an area corresponding to about 30% of the area of one cell 110.

It should be appreciated that the width, interval, and area of the electrodes 250 may vary depending on the purpose of the electrode as well as the applications of the light-controlling device 200. For example, when the light-controlling device 200 is intended to be a semi-transparent light-controlling device, the width, interval, and area of the electrodes 250 may be determined to obtain a desired light transmittance of the light-controlling device 200.

The second electrode 260 may be a conductive structure formed on the second substrate 220. The second electrode 260 is formed to widely spread the charged particles 271 over the second substrate 220. Since the second electrode 260 is formed to widely spread the charged particles 271 parallel to the second substrate 220, the second electrode 260 may be referred to as a spreading electrode. In some embodiments, the second electrode 260 may have a second electrode structure. In such a case, the second electrode 260 may be disposed on the entire region of the cell 110 and/or the second substrate 220. The second electrode 260 may be formed of a transparent conductive material. For instance, the second electrode 260 may be formed of a material, such as ITO, IZO, CNTs, graphene, or PEDOT:PSS. The second electrode 260 may also be formed of a metal, such as chromium, molybdenum, silver, aluminum, copper, magnesium-silver, magnesium-calcium, aluminum-silver, or ytterbium-silver.

The second electrode 260 may be in a voltage application state, a ground state, or a floating state. The floating state may refer to a state in which the second electrode 260 is not electrically connected to other elements using, for example, lines.

Depending on a method of driving the second electrode 260, the second electrode 260 may be electrically connected to lines to enable application of a voltage to the second electrode 260, or lines may not be disposed in a like manner to a floating state.

In some embodiments, a particle guidance member 230 may be formed on the first substrate 210 to expose the first electrode 250. The particle guidance member 230 may be formed to guide, or otherwise direct, the charged particles 271 towards the electrode 250 disposed in the open channel space. The particle guidance member 230 may be referred to as a particle guidance structure or a particle inducing layer. The particle guidance member 230 may include an organic insulating material, for example, any one of polyimide (PI), photoacryl, and benzocyclobutene (BCB) or photoresist.

The particle guidance member 230 may be formed to have a greater thickness than the first electrode 250. When the particle guidance member 230 has a smaller thickness than the electrode 250, it may be difficult to guide the charged particles 271 towards the first electrode 250. The thickness of the particle guidance member 230 may depend on the amount of the charged particles 271 provided in the light-controlling device 200. The particle guidance member 230 may have a thickness sufficient to induce the charged particles 271 towards the electrode 250 and also form a reservoir to contain the charged particles 271 without negatively affecting the transmittance of the device during the transmission mode.

As shown in FIG. 2, the particle guidance member 230 has a hollow space with an opening formed to expose the first electrode 250. In some embodiments, some surfaces of the particle guidance member 230 may be angled. For instance, surfaces of the particle guidance member 230 serving as the side walls of hollow space may be tapered. In other words, the side walls of the hollow space of the particle guidance member 230 may be angled between about 30° and about 90° in reference to the upper surface of the particle guidance member 230 facing the second substrate 220. With an angle equal to or less than about 30°, it may not be easy to guide the charged particles 271 towards the first electrode 250. Also if the angle is equal to or larger than about 90°, it may not be easy to allow the charged particles 271 to escape from the hollow space. Accordingly, appropriate angle of the side wall can reduce the required driving voltage and increase the operation speed of the light-controlling device 200.

Further, in some embodiments, the particle guidance member 230 may have a rounded surface, and the hollow space formed by the rounded surface of the particle guidance member 230 may have a rounded opening to collect the particles 271. More detailed construction of the hollow space of the particle guidance structure 230 will be described later with reference to FIGS. 6A and 6B.

In some embodiments, a first insulation layer and second insulation layer formed on the first electrode 250 and the second electrode 260, respectively, to maintain the charged properties of the charged particles 271 and ensure reliability of the light-controlling device 200. Throughout the present disclosure, the first insulation layer and the second insulation layer may be collectively referred to as the insulation layer. The insulation layer may also be referred to as a transmissive insulating layer and/or a transparent insulating layer when the insulation layers are intended to be transparent. The insulation layer may prevent the charged particles 271 carrying electric charges from directly contacting with the surface of the first electrode 250 and/or the second electrode 260, and become oxidized or reduced. Also, when the remaining current flows between the first electrode 250 and the second electrode 260, a voltage drop may occur during a driving operation. Thus, the insulation layer may prevent the voltage drop, thereby improving the power consumption and the driving stability. Construction and formation of the insulation layer will be described in detail later.

As shown in FIG. 2, the light-controlling device 200 also includes the partition wall 240 interposed between the first substrate 210 and the second substrate 220. The partition wall 240 may be formed as a pillar or wall type and separate the cells 110 defined in the first and second substrates 210 and 220 from one another. That is, to separate the cells 110 defined in the first and second substrates 210 and 220 from one another, the partition wall 240 may be interposed between the separated cells 110. In some embodiments, when the cells 110 are defined adjacent to one another, the partition wall 240 may be disposed to occupy at least portions of the cells 110. By separating the cells 110 from one another using the partition wall 240, the charged particles 271 disposed in the cell 110 may be prevented from leaning in one direction due to gravity. Also, the charged particles 271 may be prevented from moving from one cell to another cell so that the concentration of the charged particles 271 disposed in the cell 110 can be maintained. The partition wall 240 may be formed in a partial region according to design specifications. Also, when the partition wall 240 is not formed, the light-controlling device 200 may include column spacers.

The partition wall 240 may be formed to maintain a cell interval or a cell gap. The cell interval may refer to an interval between insulation layers when the insulation layers are formed on the first electrode 250 and the second electrode 260, or an interval between the second electrode 260 and the first substrate 210. The partition wall 240 may be formed, for example, between the second electrode 260 formed on the second substrate 220. The maintenance of the interval between the cells 110 may significantly affect the spread ratio of the charged particles 271, which will be described in further detail below. The charged particles 271 may maintain a uniform spread ratio due to the partition wall 240. Furthermore, the partition wall 240 may maximize transmittance of the light-controlling device 200 and be formed within such a range as not to lean the charged particles 271 toward one direction. The partition wall 240 may be formed of a transparent material. When the partition wall 240 is formed of a transparent material, the partition wall 240 may be formed on black matrices configured to shield incident light, or include a light shielding layer. That is, when light is incident to the light-controlling device 200, incident light may be transmitted through the partition wall 240. Accordingly, the partition wall 240 may be formed on the black matrices or include a layer configured to shield incident light, thereby increasing a shielding rate of the light-controlling device 200.

A light-adjustment medium layer 270 may be formed in a portion surrounded with the partition wall 240 between the first and second substrates 210 and 220. The light-adjustment medium layer 270 may include gas or liquid and charged particles 271 distributed therein. The fluid may protect the charged particles 271 distributed therein from external shocks and vibrations. When gas is used, the mobility of the charged particles 271 may be increased to increase response speed of the light-controlling device 200. Using gas, however, may require a higher driving voltage than the liquid form. When liquid is used, the driving voltage of the light-controlling device 200 may be lower, and positions of the charged particles 271 may be maintained according to the viscosity of the liquid even when the device is in the off state. The liquid may include a binder. Halogenated solvents, saturated hydrocarbons, silicone oils, low-molecular-weight halogen-containing polymers, epoxides, vinyl ethers, vinyl esters, aromatic hydrocarbon, toluene, naphthalene, paraffinic liquids, or poly-chlorotrifluoroethylene polymers may be used as the binder.

Figure 5:
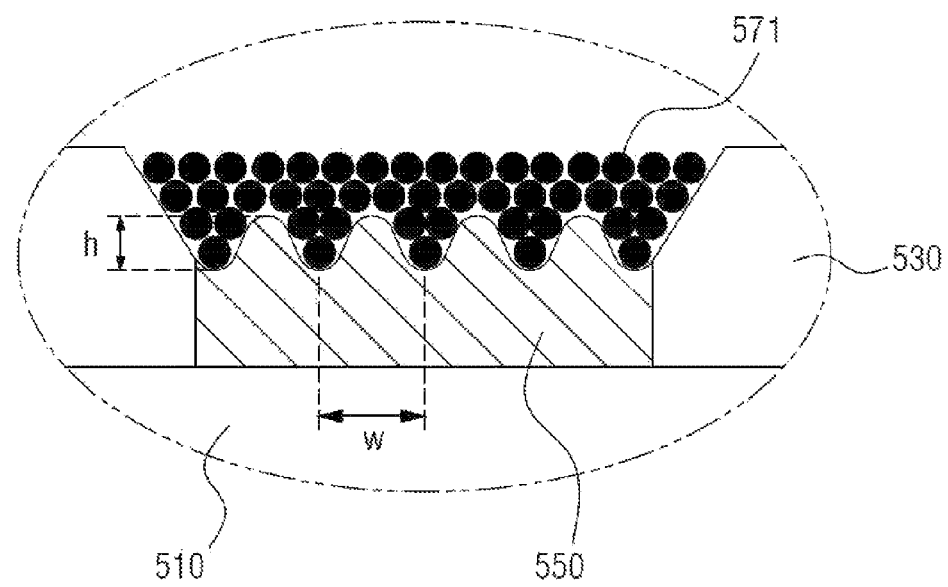
FIG. 5 is a partial enlarged view of portion A in FIG. 4.

The charged particles 271 distributed in the light-adjustment medium layer 270 may have a specific color and be positively or negatively charged. The charged particles 271 may be referred to as light-controlling charged particles, light-absorbing charged particles, light-reflecting charged particles or light-scattering charged particles. The charged particles 271 may include a core material, a polymer, and a charged material. It may be determined whether the charged particles 271 are negatively charged or positively charged depending on a charge type of the charged material. The charged particles 271 may assume a white color, a black color, or a chromatic color, or be transparent particles having a high refractive index. In some embodiments, chromatic charged particles may include both white charged particles and black charged particles. FIGS. 3 through 5 illustrate the light-controlling device 200 on assumption that the charged particles 271 of the light-adjustment medium layer 270 are black charged particles. An example case in which the light-adjustment medium layer 270 of the light-controlling device 200 includes white charged particles or transparent charged particles having a high refractive index will be described later with reference to FIGS. 11A and 11B.

The charged particles 271 may have a diameter of about 5 nm to about 1 µm. When the charged particles 271 have a size of about 1 µm or more, light controllability of the light-controlling device 200 may be degraded during, for example, shielding or scattering of light. When the charged particles 271 have a size of about 5 nm or less, the charged particles 271 may agglomerate, thereby precluding controlling the charged particles 271. The size of the charged particles 271 may be related with the size of later-described grooves of the electrode 250. Charged particles 271 having an appropriate size may be selected according to a detailed construction of the light-controlling device 200. Black charged particles may have a diameter of about 50 nm to about 500 nm.

FIGS. 3 and 4 are cross-sectional views of the light-controlling device of FIG. 1, which are taken along line II-II' of FIG. 1. Hereinafter, operations of light-controlling devices 300 and 400 according to an exemplary embodiment of the present invention will be described. Since first substrates 310 and 410, second substrates 320 and 420, second electrodes 360 and 460, particle guidance member 330 and 430, partition walls 340 and 440, first electrodes 350 and 450, and light-adjustment medium layers 370 and 470 are substantially the same as the first substrate 210, the second substrate 220, the second electrode 260, the particle guidance member 230, the partition wall 240, the first electrode 250, and the light-adjustment medium layer 270 described with reference to FIG. 2, a repeated description is omitted for brevity.

Incident light may be refracted or reflected at interfaces among the first substrate 310 or 410, the second substrate 320 or 420, the second electrode 360 or 460, the particle guidance member 330 or 430, and the electrode 350 and 450. Hereinafter, it is assumed for brevity that interfacial characteristics of the incident light are ignored. Although it is assumed that the charged particles 371 distributed in the light-adjustment medium layer 370 having negative electric charges, the charged particles 371 may carry positive electric charges.

Furthermore, the first substrate 310 and the second substrate 320 may be formed of a light-transmissive material, and at least one of the electrode 350 and the second electrode 360 may be formed of a transparent electrode so that the light-controlling device 300 can operate in a transparent mode. Hereinafter, it is assumed that the first substrate 310, the second substrate 320, and the second electrode 360 are formed of a light-transmissive material.

To drive the light-controlling device 200, a positive voltage and a negative voltage may be respectively applied to the second electrode 360 and the first electrode 350. FIG. 3 shows an example in which a positive voltage is applied to the second electrode 360 formed on the second substrate 320. A reference voltage or a voltage of about 0V may be applied to the electrode 350 disposed on the first substrate 310. Alternatively, the first electrode 350 disposed on the first substrate 310 may be in a ground state or in a floating state. When the positive voltage is applied to the second electrode 360, the negatively charged particles 371 may move toward the second electrode 360. To apply a voltage to the second electrode 360 or the first electrode 350, respective electrodes may be connected to a voltage controller through an additional electric line.

Due to the voltage applied to the second electrode 360 and the first electrode 350, the charged particles 371 may move toward the second substrate 320 and be disposed parallel to the second substrate 320. Light incident to the light-controlling device 300 may pass through the second substrate 320 and the second electrode 360, reach the charged particles 371, and be absorbed by the charged particles 371. Although FIG. 3 illustrates an example in which the charged particles 371 are arranged in one column, the charged particles 371 may be arranged in one or more columns based on the concentration of the charged particles 371. In this case, even light passing between the charged particles 371 or refracted light may be absorbed by adjacent charged particles 371. A block color may be visible in an upper portion of the light-controlling device 300 due to the above-described arrangement of the charged particles 371.

Since the incident light is shielded due to the arrangement of the charged particles 371 with the voltage application, a current state of the light-controlling device 300 is referred to as a shielding mode.

Light incident toward the first substrate 310 may also be shielded. For example, when light is incident toward the first substrate 310, the incident light may be transmitted through the first substrate 310 and the particle guidance member 300, reach the charged particles 371, and be absorbed by the charged particles 371. Accordingly, a block color may be visible also in a lower portion of the light-controlling device 300 in the shielding mode.

FIG. 4 illustrates an example in which a positive voltage is applied to the first electrode 450 formed on the first substrate 410. A reference voltage or a voltage of about 0V may be applied to the second electrode 460 formed on the second substrate 420, or the second electrode 460 may be in a ground state or a floating state.

Due to the voltage applied to the electrode 450 and the second electrode 460, charged particles 472 may move toward the first substrate 410 and be disposed on a top surface of the first electrode 450 of the first substrate 410 and within the hollow space of the particle guidance member 430.

Light incident from the second substrate 420 to the light-controlling device 400 may sequentially pass through the second substrate 420, the second electrode 460, the light-adjustment medium layer 470, the particle guidance member 430, and the first substrate 410, and escape from the light-controlling device 400. Since the incident light is transmitted through the light-controlling device 400, an object disposed on a rear surface of the light-controlling device 400 may be visible in an upper portion of the light-controlling device 400. Since incident light is transmitted due to the above-described arrangement of the charged particles 472 with the voltage application, a current state of the light-controlling device 400 may be referred to as a transmissive mode or transparent mode.

FIG. 4 illustrates only light incident toward the second substrate 420, light incident toward the first substrate 410 may be transmitted. The light incident toward the first substrate 410 may be transmitted through the first substrate 410, the particle guidance member 430, the light-adjustment medium 470, the second electrode 460, and the first substrate 410, and then transmitted through the light-controlling device 400. Part of the light incident toward the first substrate 410 may be reflected by or absorbed in the electrode 450 formed on the first substrate 410. However, as described above with reference to FIG. 3, since the area of the electrode 450 is between 0.1% and 5% of the area of the cell 110, it may not be difficult to visually recognize an object disposed on a rear surface of the light-controlling device 400. Accordingly, an object disposed under the light-controlling device 400 or on the rear surface of the light-controlling device 400 may be visible in a transparent mode.

Although the present specification describes that the light-controlling device 300 or 400 operates in the transparent mode and shielding mode for brevity, the light-controlling device 300 or 400 may also operate in various other modes, such as gray mode or opaque mode by changing the driving voltage.

When the concentration of the charged particles 472 is reduced, there may not be enough charged particles 472 to be distributed over the second electrode 460 during the shielding mode, thereby reducing a shielding rate. Also, although the charged particles 472 provided at a high concentration may be controlled by increasing the width of the electrode 450, transmittance may be reduced. Accordingly, in the light-controlling device 400, a shielding rate and transmittance may have a trade-off relationship with each other. However, in the light-controlling device 400 according to one exemplary embodiment of the present invention, the shielding rate and transmittance may be simultaneously increased by using the particle guidance member 430 having the hollow space and the first electrode 450 having a plurality of grooves.

The particle guidance member 430 having the hollow space will now be described with reference to FIG. 4. Referring to FIG. 4, the charged particles 472 may be disposed within the hollow space of the particle guidance member 430. As described above, the charged particles 472 may move due to an electric field of the electrode 450, and the charged particles 472 may be guided by the particle guidance member 430 not to side surfaces of the electrode 450 but to the top surface of the electrode 450. Accordingly, to guide the charged particles 472, an angle formed by the side walls of the hollow space may have an angle in the range from about 30° to about 90°, preferably, from about 40° to about 80° in reference to the top surface of the particle guidance member 430.

In the light-controlling device 400 according to one exemplary embodiment of the present invention, transmittance may be increased using the electrode 450 including the plurality of grooves. When the electric field is formed by applying a voltage to the electrode 450 in the transparent mode, the charged particles 472 may be stacked on the grooves of the first electrode 450 disposed within the hollow space so that the charged particles 472 can be collected within a limited width of the first electrode 450. Because the charged particles 472 are stacked within the hollow space, transmittance of the light-controlling device 400 may be increased in the transparent mode.

Hereinafter, the first electrode 450 including the plurality of grooves will be described in further detail with reference to FIG. 5.

FIG. 5 is a partial enlarged view of portion A of FIG. 4. As shown in FIG. 5, the first electrode 550 has a plurality of grooves that is exposed for collecting the charged particles 571. As illustrate in FIG. 5, the width "w" of the grooves may refer to a horizontal distance between two recessed portions and/or two protruded portions. The height "h" of the grooves may refer to a vertical distance from the lower end of a recessed portion and a top end of a protrusion. The plurality of grooves may not be formed regularly, and thus each of the grooves may have different widths "w" and heights "h." As mentioned above, the width "w" and height "h" of the plurality of grooves may be determined based on the size of the charged particles 572.

The charged particles 572 may be stacked on the surface of the first electrode 550 and inside and outside the plurality of grooves. To effectively collect charged particles 572, each groove may be formed to be larger than the diameter of the charged particles 572.

When the first electrode 550 includes the plurality of grooves, the surface area of the first electrode 550 is increased. The surface area of the electrode 550 may increase in proportion to the number of grooves. Accordingly, the space in which the charged particles 572 may be contained may increase in proportion to the size and number of the grooves. However, when the height of the electrodes 550 is excessively increased as compared with a cell height of a light-controlling device, reliability and shielding rate of the light-controlling device may be reduced. Thus, the height of the grooves as well as the total height of the first electrodes 550 may be limited. When the surface area of the first electrode 550 is increased, an electric field of the first electrode 550 may be formed more strongly, thereby further facilitating the control of the charged particles 572.

In one exemplary embodiment, the particle guidance member 530 including the hollow space allows to maintain the sufficient light transmittance rate and light shielding rate of the light-controlling device 500 with a given concentration of the charged particles 572 in the light-adjustment medium layer 570. Simultaneously, the charged particles 572 may be guided to the top surface of the first electrode 550 during the transparent mode, thereby increasing transmittance.

Figure 6A:
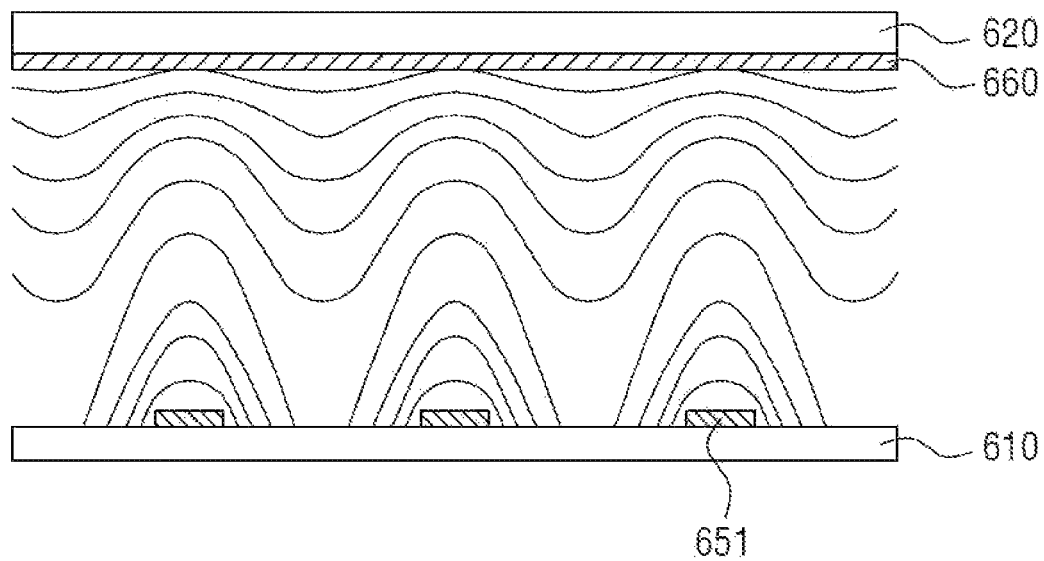
FIGS. 6A and 6B are schematic views of an electric line of force for describing an electric field of a light-controlling device according to an exemplary embodiment of the present invention.
Figure 6B:
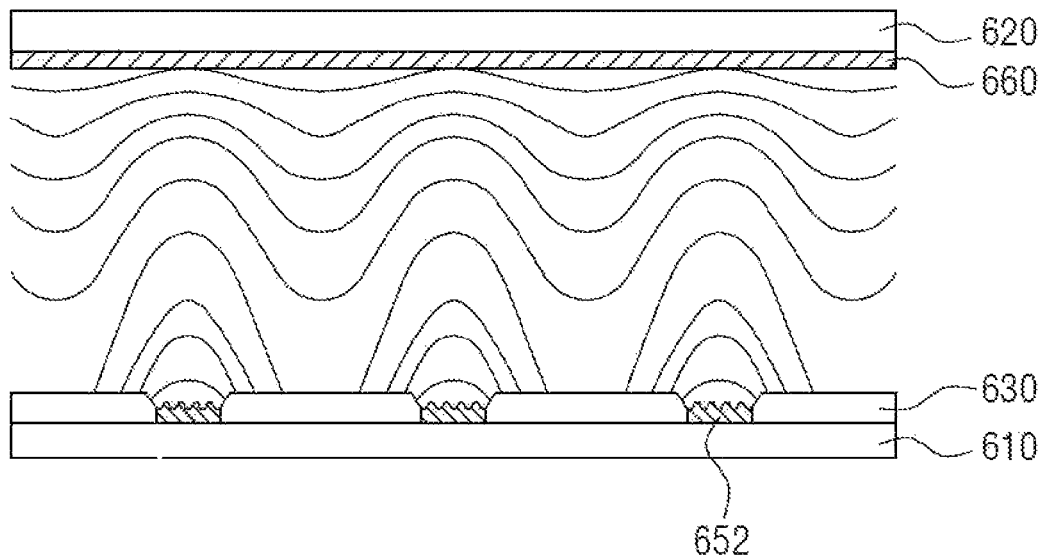

FIGS. 6A and 6B illustrate an exemplary electric field generated by the light-controlling. Referring to FIG. 6A, the first substrate 610 and the second substrate 620 is formed opposite each other, the electrode 651 is formed on the first substrate 610, and the second electrode 660 is formed on the second substrate 620. A predetermined voltage may be applied on the first electrode 651, and a reference voltage (e.g., voltage of about 0V) is applied to the second electrode 660 disposed on the second substrate 620. In some cases, the second electrode 660 may be in a ground state or in a floating state. During the operation of the light-controlling device, an electric field is generated from the first electrode 651. The electric field of the first electrode 651 is formed around the electrode 651 and the effect of electric field is weaker in the regions away from the electrode 651. As shown in FIG. 6A, the electric field of from the first electrode 651 can also be formed on the side surfaces of the first electrode 651. As such, the charged particles may be drawn to the sides of the first electrode 651 in addition to the top surface of the electrode 651. The charged particles adhered on the side surfaces near the first electrode 651 effectively increases the area that hinders the light passing through the light-controlling device during the transmittance mode.

However, as shown in FIG. 6B, the particle guidance member 630 can be formed around the first electrode 652 to be thicker than the first electrode 652. The particle guidance member 630 may not affect an electric field of the first electrode 652, but the particle guidance member 630 guides the charged particles towards the first electrode 652. Also, the particle guidance member 630 includes a tapered hollow space to help charged particles to move towards the first electrode 652. The charged particles on the angled surface of the particle guidance member 630 are more easily moved toward the first electrodes 652 even with the same electric field generated from the first electrode 652.

Figure 7A:
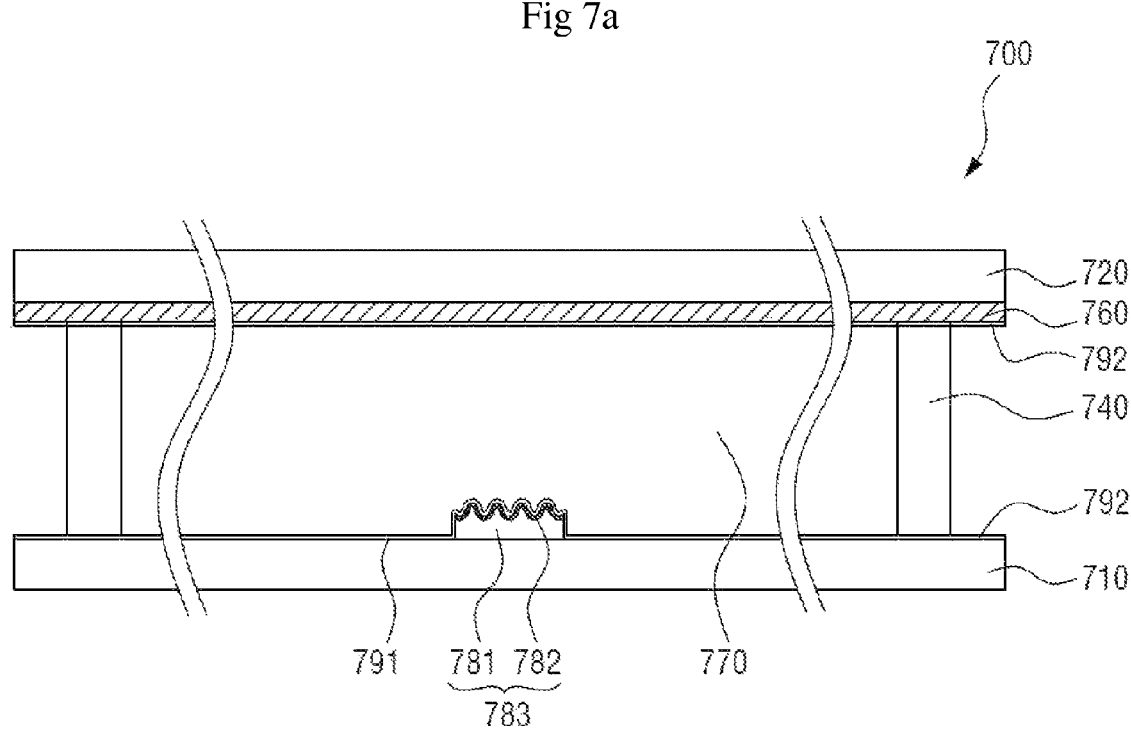

FIGS. 7A and 7B, each illustrates an exemplary embodiment of the light-controlling device. Descriptions regarding the first substrate 710, the second substrate 720, the second electrode 760, the partition wall 740, and the light-adjustment medium layer 770 will be omitted because these elements have similar structures and functionalities as the respective elements with reference to other embodiments of the light-controlling device described above. Also, it should be noted that the charged particles included in the light-adjustment medium layer 770 are omitted from FIGS. 7A and 7B.

Referring to FIG. 7A, the light-controlling device 700 includes the first electrode 783. In this embodiment, the first electrode 783 includes a conductive (e.g., metal) layer 782 and a polymer layer 781 disposed under the conductive layer 782. That is, the polymer layer 781 is formed on the first substrate 710, and the conductive layer 782 is disposed as the uppermost layer of the first electrode 783. Further, the conductive layer 782 is formed to have the same shape as the underlying polymer layer 781 that has the plurality of grooves. Accordingly, the conductive layer 782 also has the plurality of grooves that matches with the grooves of the polymer layer 781. The polymer layer 781 may have a specific glass transition temperature (e.g., threshold temperature) Tg. That is, the polymer layer 781 can be formed into a desired state by applying temperature. For example, the polymer layer 781 may be formed into a solid state when it is certain range of temperatures is applied to the polymer layer 781. Similarly, the polymer layer 781 may be put into a rubber state in a predetermined range of glass transition temperature Tg. The polymer layer 781 may become ductile and flexible in the rubber state. The state of the polymer layer 781 may be reversible. For instance, when the temperature drops to the glass transition temperature Tg, the polymer layer 781 that was put into a rubber state may make a phase transition to back to a solid state. In this process, some of the polymer layer 781 may be in a buckled state and form a buckling structure (e.g., a plurality of grooves). Due to a change in the shape of the polymer layer 781, compressive stress and tensile stress may be applied to the conductive layer 782 disposed on the polymer layer 781. Since the compression stress and the tensile stress act on the conductive layer 782 at the same time, the surface of the conductive layer 782 may be formed in accordance to the buckling structure formed on the surface of the polymer layer 781.

In the first electrode 783 having the buckling structure, the polymer layer 781 may be formed to a thickness of about 10 nm to about 5 μm, and the conductive layer 782 may be formed to a thickness of about 10 nm to about 1 μm. When each of the polymer layer 781 and the conductive layer 782 has a thickness less than about 10 nm, it may be difficult to form the buckling structure using the phase transition. When the polymer layer 781 has a thickness more than about 5 μm and the conductive layer 782 has a thickness more than 1 μm, it may be necessary to perform a process of forming a buckling structure at an excessively high temperature.

The light-controlling device 700 may include only the first electrode 783 having the buckling structure without forming the above-described insulating structure (i.e., polymer layer). Due to the first electrode 783 having the surface on which the buckling structure is formed, the surface area of the first electrode 783 may increase. Thus, when a voltage is applied to the first electrode 783, a larger number of charged particles may be collected. As a result, transmittance of the light-controlling device 700 may be improved in the transparent mode.

In the light-controlling device 700, a first insulation layer 791 may be formed on the first substrate 710 and the first electrode 783, and a second insulation layer 792 may be formed on the second electrode 760. The insulations layers 791 and 792 may be at least one of alumina ($Al_2O_3$) or silicon oxide ($SiO_2$), which is both light-transmissive and insulating material. The insulation layers 791 and 792 can prevent direct contact of the charged particles with the first electrode 783 and second electrode 760 to maintain the properties of charged particles, and thereby improve the reliability of the light-controlling device 700. The insulation layers 791 and 792 may prevent charged particles carrying electric charges from reacting with the surface of the first electrode 783 and/or the second electrode 760 and being oxidized or reduced. Each of the insulation layers 791 and 792 may be referred to as a protection layer, a transmissive insulating layer, or a transparent insulating layer.

When the remaining current flows between the electrodes 783 or the second electrodes 760, a voltage drop may occur during a driving operation. Thus, the insulation layers 791 and 792 may prevent the voltage drop and improve power consumption, or ensure driving stability. Also, in some embodiments where the second electrode 760 operates in a floating state, the insulation layer 792 may be omitted.

FIG. 7B is a cross-sectional view of a light-controlling device 700 according to various exemplary embodiments of the present invention. Referring to FIG. 7B, the light-controlling device 700 may include the first electrode 783 including a polymer layer 781 and a conductive layer 782, and a particle guidance member 730. The light-controlling device 700 of FIG. 7B may include both the first electrode 783 and the particle guidance member 730. As described above, in the light-controlling device 700 shown in FIG. 7B, the surface area of the first electrode 783 is increased by the projections/depressions of the first electrode 783 and the charged particles are guided by the particle guidance member 730 to maximize the amount of charged particles that can be collected in a limited space. Accordingly, the light-controlling device 700 can employ increased amount of charged particles to maximize the shielding rate without the negative effects of the increased amount of charged particles during the transmittance mode (e.g., increase in the non-light transmittance area formed by the charged particles collected by the first electrode during).

Figure 8:
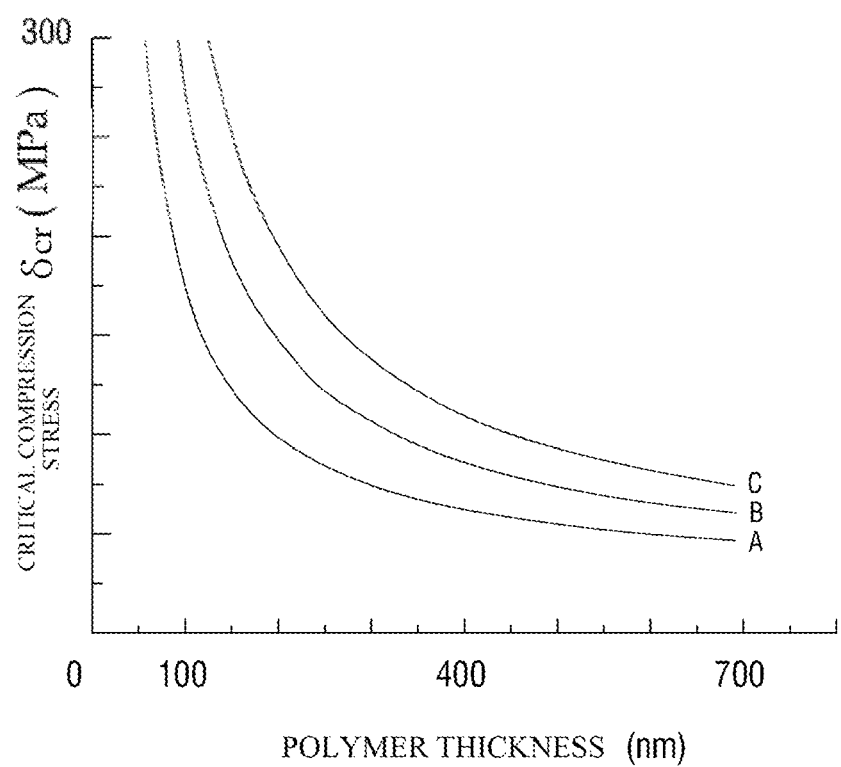
FIG. 8 is a graph showing a correlation between the thickness of a polymer layer and critical compression stress relative to the thickness of a metal layer, according to an exemplary embodiment of the present invention.

FIG. 8 is a graph showing a correlation between the thickness of the polymer layer 781 and critical compressive stress relative to the thickness of the conductive layer 782 illustrated in FIGS. 7A and 7B. Although, the graph of FIG. 8 will be described with reference to the polymer layer 781 and the conductive layer 782 of FIGS. 7A and 7B, it should be appreciated that the described relationship may also be applied in other embodiments employing such multi-layered electrode structure. Curves A, B and C show cases in which the conductive layer 782 has a thickness of about 30 nm, 50 nm and 70 nm, respectively.

As shown in FIG. 8, the critical compression stress may increase as the thickness of the first insulation layer 781 is reduced. As illustrate by the curves A, B and C, the critical compression stress may slowly increase until the thickness of the polymer layer 781 reaches about 200 nm, and sharply increase when the polymer layer 781 has a thickness of about 200 nm or less. When the polymer layer 781 has a thickness of about 200 nm, a critical compression stress of about 100 MPa is obtained from curve A corresponding to the case in which the conductive layer 782 has a thickness of about 30 nm, a critical compression stress of about 150 MPa is obtained from curve B corresponding to the case in which the conductive layer 782 has a thickness of about 50 nm, and a critical compression stress of about 200 MPa is obtained from curve C corresponding to the case in which the conductive layer 782 has a thickness of about 70 nm. When heat is applied at a glass transition temperature or higher under conditions of the above-described critical compression stresses, a buckling structure having different height and width may be formed according to the thickness of the conductive layer 782. As the critical compression stress increases, the buckling structure may be formed more densely. As the critical compression stress is reduced, the buckling structure may be formed more coarsely. As the thickness of the polymer layer 781 increases, the buckling effect may be reduced.

When the critical compression stress is relatively high, a temperature equal to or higher than the glass transition temperature may be required. When a heat equal or greater than a predetermined glass transition temperature is applied, the polymer layer 781 may make a phase transition from a rubber state to a liquid state. When the temperature drops to a certain level and the polymer layer 781 returns to a solid state, a buckling structure may be formed on the polymer layer 781 to cause the conductive layer 782 to have the similar buckling shape. As such, the thicknesses of the polymer layer 781 and the conductive layer 782 may be determined in consideration of the critical compression stress and the glass transition temperature, and also in consideration of the width and height of grooves to be formed on the conductive layer 782.

Figure 9:
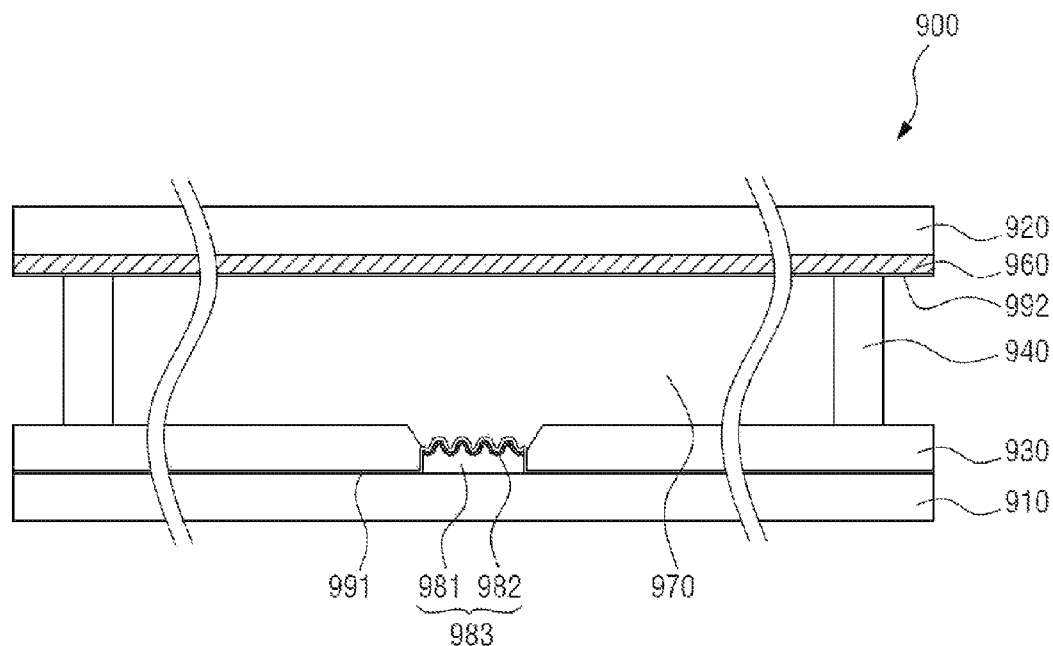
Figure 10:
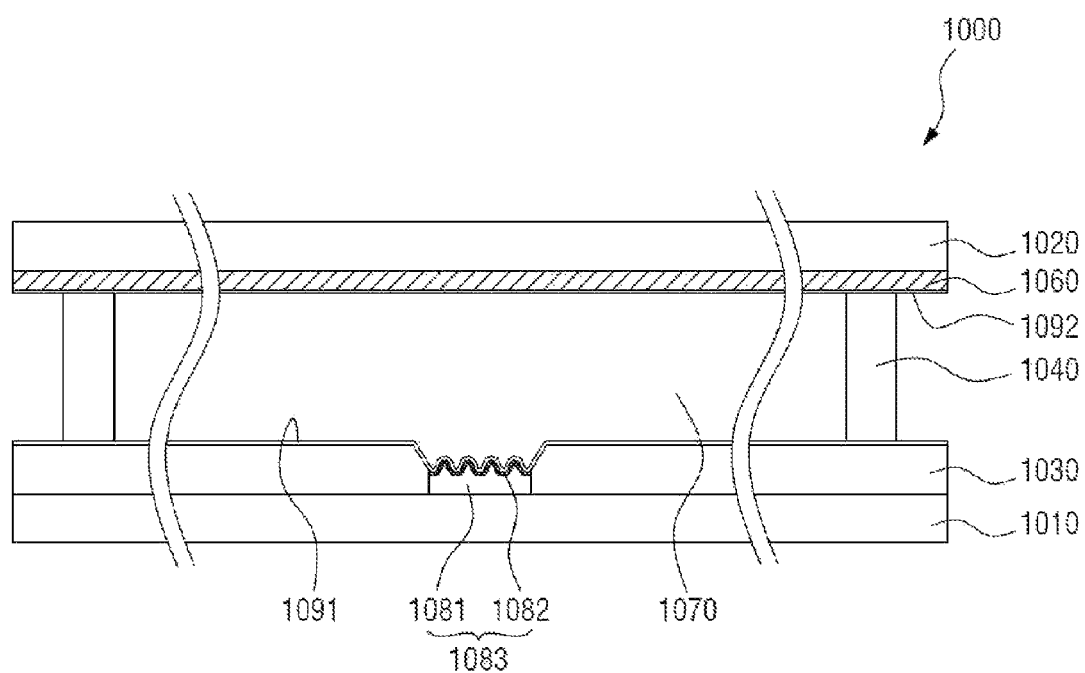

FIGS. 9 and 10 illustrate embodiments of exemplary light-controlling devices. In this example, the first insulation layer 991 (1091 of FIG. 10) is formed on the first electrode 983 and 1083. The first insulation layer 991 (1091) may be formed of a light-transmissive material and an insulating material, which may be one of alumina ($Al_2O_3$) and silicon oxide ($SiO_2$). Since the first insulation layer 991 (1091) is formed on the surface of the first electrode 983 (1083 of FIG. 10), the first insulation layer 991 (1091) may be thinly formed not to planarize the surface of the first electrode 983 (1083). The first insulation layer 991 (1091) may be formed using a chemical vapor deposition (CVD) process. The first insulation layer 991 (1091) may be stacked using any material or method capable of forming an insulating layer to prevent charged particles from being in direct contact with the first electrode 983 (1083) without planarizing the first electrode 983 (1083). Further, at least a portion of the first insulation layer 991 (1091), which may transmit light, may be formed of a material having a similar refractive index to the material adjacent to the first insulation layer 991 (1091) to improve transmittance.

The first insulation layer 991 (1091) may be configured to maintain the characteristics of charged particles and improve reliability of the light-controlling device 900 (1000 of FIG. 10). The first insulation layer 991 (1091) may be referred to as a protection layer, a transmissive insulating layer, or a transparent insulating layer. The first insulating layer 991 (1091) may be formed on the first electrode 983 (1083) to prevent charged particles from being in contact with the first electrode 983 (1083) and control charged particles. The first insulation layer 991 (1091) may prevent charged particles carrying electric charges from being oxidized or reduced by reacting with the surface of the first electrode 983 (1083) or the second electrode 960 (1060 of FIG. 10). Also, when the remaining current flows between the first electrodes 983 (1083) or the second electrodes 960 (1060), a voltage drop may occur during a driving operation. Thus, the first insulation layer 991 (1091) may prevent the voltage drop and improve power consumption, or ensure driving stability. Meanwhile, when a voltage is applied to the first electrode 983 (1083) and the electric field is formed, even if the first insulation layer 991 (1091) is formed on the first electrode 983 (1083), since the insulation layer 991 (1091) has a small thickness, the electric field of the first electrode 983 (1083) may be maintained. Accordingly, the first insulation layer 991 (1091) may be formed to such a thickness as to maintain the electric field of the first electrode 983 (1083) and not planarize the grooves formed on the surface of the first electrode 983 (1083).

Meanwhile, since the light-controlling device according to some exemplary embodiments of the present invention includes the particle guidance member 930 (1030 of FIG. 10) having a hollow space, which may be partially exposing the first electrode 983 (1083).

The particle guidance member 930 (1030) and the first insulation layer 991 (1091) may be formed in a different order from the above-described order. Referring to FIG. 9, the first insulation layer 991 is formed over the first substrate 910 and the first electrode 983. The particle guidance member 930 is formed on the first insulation layer 991 in such a way that a hollow space is configured to expose at least a portion of the first electrode 983. Referring to FIG. 10, the first insulating layer 1091 is formed on the particle guidance member 1030 and the electrode 1083.

In these exemplary embodiments of light-controlling device 900 (1000), the position of the first insulation layer 991 (1091) may be selected in consideration of adhesion of the first insulation layer 991 (1091) to the material forming the partition wall 940 (1040 of FIG. 10) and/or the material forming the particle guidance member 930 (1030) as well as the fabrication processes of such elements.

Figure 11B:
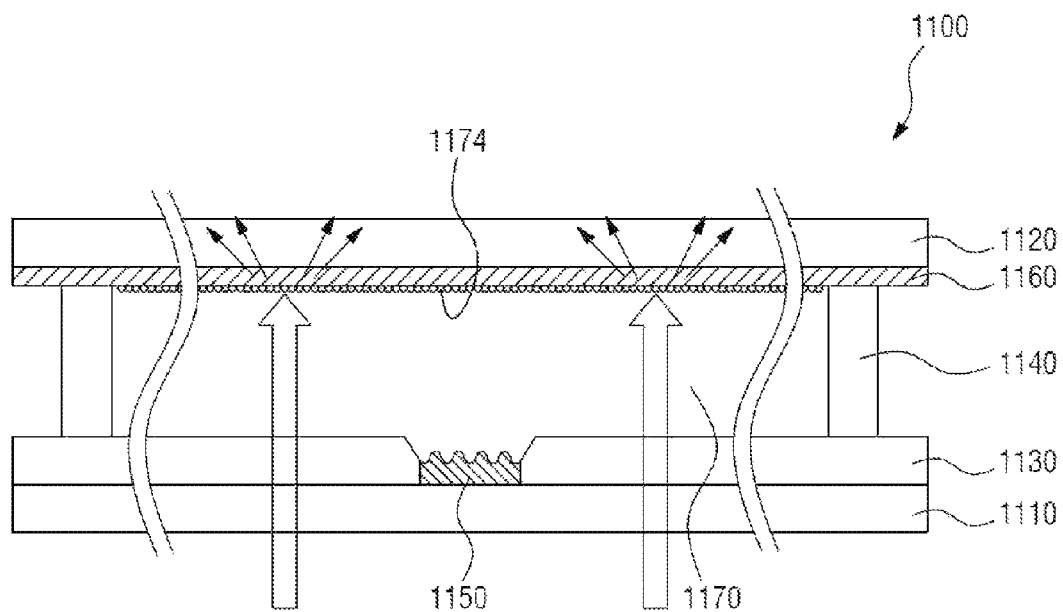

FIGS. 11A and 11B are cross-sectional views of exemplary light-controlling device according to respective embodiments of the present invention. Incident light may be refracted or reflected at interfaces among the first substrate 1110, the second substrate 1120, the second electrode 1160, the particle guidance member 1130 and the first electrode 1150. Hereinafter, it is assumed for brevity that interfacial characteristics of the incident light are ignored.

FIG. 11A illustrates the light-controlling device 1100 employing a plurality of white light-reflecting particles 1173 as the charged particles. While black charged particles may absorb light, the white light-reflecting particles 1173 may scatter and/or reflect the incident light. That is, the white light-reflecting particles 1173 may refract light incident to the white light-reflecting particle 1173 and cause scattering of the light (e.g., reflecting the light). Hereinafter, the white light-reflecting particles 1173 will be described in detail. Although it is assumed that the white light-reflecting particles 1173 carry negative electric charges, it should be appreciated that the white light-reflecting particles 1173 may carry positive electric charges in some other embodiments.

To drive the light-controlling device 1100, positive voltage may be applied to the second electrode 1160. A reference voltage or a voltage of about 0V may be applied to the first electrode 1150 disposed on the first substrate 1110. Alternatively, the first electrode 1150 disposed on the first substrate 1110 may be in a ground state or in a floating state.

Due to the generated electric field, the white light-reflecting particles 1173 is moved toward the second substrate 1120 and disposed over the second substrate 1120. Although the light incident to the light-controlling device 1100 may pass through the second substrate 1120 and the second electrode 1160, the light is scattered/reflected by the white light-reflecting particles 1173 as shown in FIG. 11A. Although the white light-reflecting particles 1173 are illustrated as a single layer of particles, the white light-reflecting particles 1173 may be arranged in multiples layers depending on the concentration of particles in the device. The light scattered and/or reflected by the white light-reflecting particles 1173 may be scattered/reflected multiple times by the white light-reflecting particles 1173 and escape from the second substrate 1120. Depending on the arrangement of the white light-reflecting particles 1173, an opaque region may be visible at an upper portion of the light-controlling device 1100.

Since the above-described arrangement of the white light-reflecting particles 1173 due to the voltage application causes scattering of incident light, a current state of the light-controlling device 1100 may be referred to as an opaque mode.

Light incident toward the first substrate 1110 may also be scattered. The light incident toward the first substrate 1110 may be transmitted through the first substrate 1110 and the particle guidance member 1130 and reach the white light-reflecting particles 1173. The incident light may be scattered by the white light-reflecting particles 1173. Part of the light incident toward the first substrate 1110 may be reflected by or absorbed in the first electrode 1150. When the first electrode 1150 is a light-transmissive type, light incident to the first electrode 1150 may also pass through the first electrode 1150 and meet the white light-reflecting particles 1173, thereby increasing a scattering rate of incident light. Accordingly, an opaque region may be visible also at a lower portion of the light-controlling device 1100 in the opaque mode.

When black charged particles are used to absorb light and a projection image is irradiated, the resolution of the projected image may be reduced, thereby degrading visibility. However, since the white light-reflecting particles 1173 are highly capable of dispersing incident light and embodying an opaque state, when a projected image is irradiated, the projection screen may have good visibility and embody high-resolution images.

Furthermore, when both the second electrodes 1160 and the first electrode 1150 are transparent electrodes and the white light-reflecting particles 1173 are used, light incident to the first electrode 1150 may not also be absorbed but be scattered. When the white light-reflecting particles 1173 are used, a high-transmittance light-controlling device 1100 having a transmittance of about 70% or higher may be embodied. The high-transmittance light-controlling device 1100 may be used for indoor building materials, such as functional windows, functional glass doors, or functional glass walls.

FIG. 11B illustrates an embodiment employing a plurality of transparent light-scattering particles 1174 having a high refractive index as the charged particles. When the light-scattering particles 1174 having the high refractive index are used, the light-controlling device 1100 may operate as a diffuser. That is, when incident light reaches the light-scattering particles 1174 as shown in FIG. 11B, the incident light may not be scattered and reflected as shown in FIG. 11A but be refracted and dispersed in the direction indicated by arrows of FIG. 11B.

In order that the light-controlling device 1100 may operate as the diffuser as shown in FIG. 11B, the light-scattering particles 1174 having a high refractive index may be used, and a material such as titanium oxide ($TiO_2$) may be used as the charged particles 1174. The light-controlling device 1100 including the light-scattering particles 1174 having a high refractive index may be utilized as a diffuser for an illumination system or a projection screen capable of being irradiated with light through a rear surface thereof and allowing the object to be visible through a front surface thereof.

Figure 12:
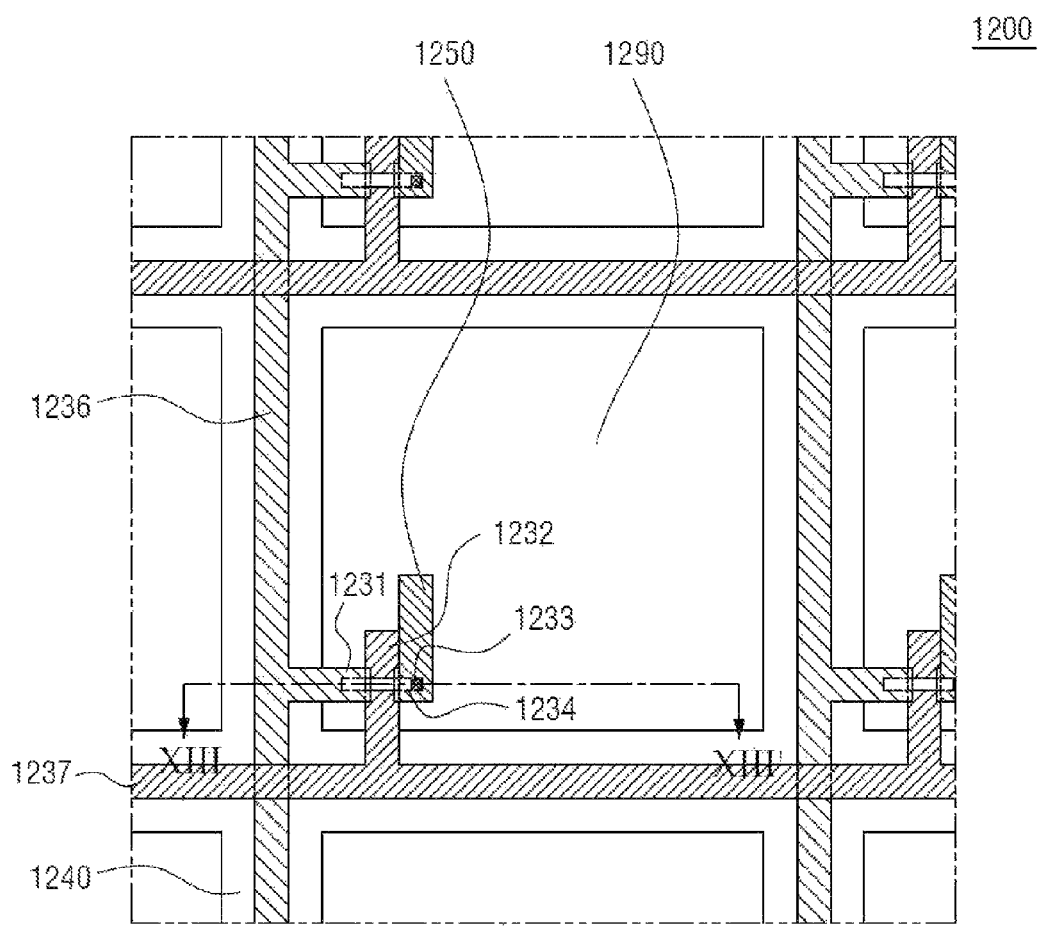
FIG. 12 is a plan view of a light-controlling device according to another exemplary embodiment of the present invention.
Figure 13:
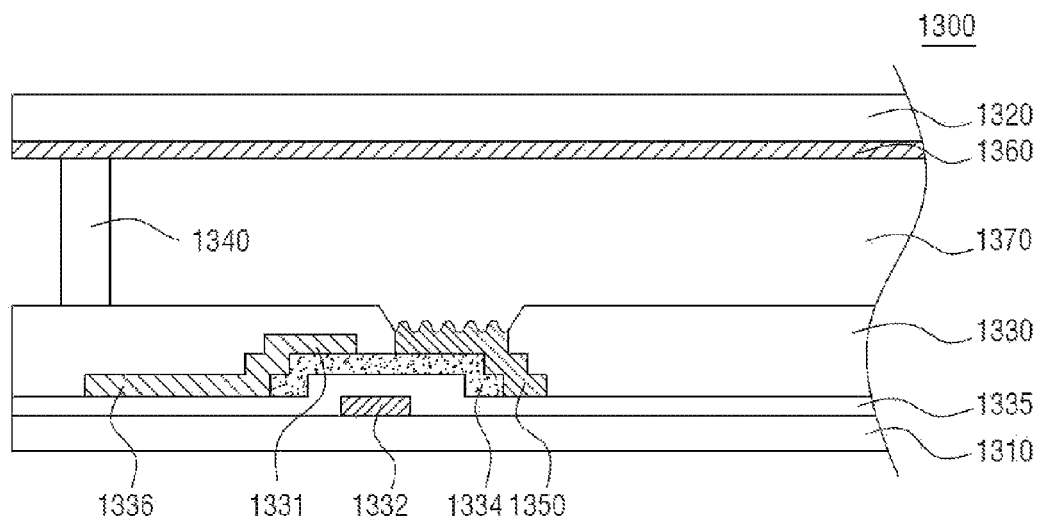
FIG. 13 is a cross-sectional view of a light-controlling device, which is taken along line XIII-XIII' of FIG. 12.

FIG. 12 is a plan view of an exemplary light-controlling device 1200 according to an embodiment of the present invention, and FIG. 13 is a cross-sectional view of the light-controlling device at the line XIII-XIII' shown in FIG. 12. Referring to FIGS. 12 and 13, each of the cells 1290 included in the light-controlling devices 1200 (1300) may include a first substrate 1310, a second substrate 1320, a thin film transistor (TFT) including the first electrode 1250 (1350) formed on the first substrate 1310, a second electrode 1360 formed on the second substrate 1320, an particle guidance member 1330 formed on the first substrate 1310, and a partition wall 1340. Although it is illustrated in FIGS. 12 and 13 that a single first electrode 1250 (1350) is formed in each of the cells 1290, the number of first electrode formed in the cell 1290 is not limited thereto, and a plurality of the first electrodes 1250 (1350) may be disposed to be separated from one another in each of the cells 1290.

At least one conductive material layer and at least one insulating material layer may be formed on the first substrate 1310. The conductive material layer may include various electrodes and lines configured to apply signals to the various electrodes. The conductive material layer may include a gate electrode 1232 (1332), a source electrode 1231 (1331), and a drain electrode. The lines may include a plurality of gate lines 1237 electrically connected to the gate electrode 1232 (1332), and a plurality of data lines 1236 electrically connected to the source electrode 1231 (1331). Also, at least one switching device 1234 (1334) may be formed on the first substrate 1310. In the exemplary light-controlling device 1300 shown in FIG. 13, the thin film transistor (TFT) may be formed on the first substrate 1310 and connected to the gate lines 1237 and the data line 1336. The TFTs may correspond to at least one first electrode 1350 and turn on or off the voltage applied to the first electrode 1350.

The gate lines 1237 (shown in FIG. 12) may extend in a first direction of the first substrate 1310. For example, the gate lines 1237 may be formed in a widthwise direction of the first substrate 1310. The gate lines 1237 may include a single layer formed of a metal, such as molybdenum (Mo), silver (Ag), and aluminum (Al), or an alloy thereof. In some embodiments, the gate lines 1237 may include a multilayered structure including the above-described single layer and another layer formed of a material having good physical and electrical contact characteristics, such as chromium (Cr), titanium (Ti), or tantalum (Ta).

The data lines 1236 (1336) may extend in a second direction of the first substrate 1310. For instance, the data lines 1236 (1336) may be formed in a lengthwise direction of the second substrate 1320. The data lines 1236 (1336) may include a single layer formed of a metal, such as molybdenum, silver, or aluminum, or an alloy thereof. Alternatively, the data lines 1236 (1336) may include a multilayered structure including the above-described single layer and another layer formed of a material having physical and electrical contact characteristics, such as chromium, titanium, or tantalum. The data lines 1236 (1336) and the gate lines 1237 may be formed on the first substrate 1310 and divide unit cells 1290 arranged in a matrix shape from one another.

Furthermore, the insulating material layer formed on the first substrate 1310 may include a gate insulating layer 1335, an interlayer insulating layer, and/or a particle guidance member 1330.

At least one conductive material layer and at least one insulating material layer may be appropriately arranged in each of the unit cells 1290 of the first substrate 1310 so that the respective cells 1290 can be driven independently. A single first electrode 1350 may be disposed to correspond to each of the cells 1290. However, the present invention is not limited thereto, and two or more of the first electrodes 1350 may be disposed in each of the cells 1290.

For brevity, FIG. 13 shows an example in which only one first electrode 1350 is disposed on the first substrate 1310, and one first electrode 1350 occupies one cell 1290. However, it may become apparent to those of ordinary skill in the art that various conductive material layers and insulating material layers other than the first electrode 1350 may be appropriately arranged to enable appropriate driving operations.

A drain electrode itself may be driven as the light-controlling electrode 1350 disposed on the first substrate 1310 as shown in FIG. 12. Alternatively, an additional first electrode 1350 may be formed on the drain electrode. The first electrode 1350 may be disposed in the center of the cell 1290 or slanted toward one direction. A surface of the first electrode 1350 may include a plurality of grooves, and the particle guidance member 1330 may include a hollow space exposing at least a portion of the first electrode 1350.

In the current example in which the particle guidance member 1330 including the hollow space exposing the surface of the first electrode 1350 and at least the portion of the first electrode 1350 is disposed in the center of the cell 1290, a detailed construction and a relationship with charged particles are substantially the same as described above with reference to FIGS. 3 and 4.

However, when the first electrode 1350 is disposed on one side of the cell 1290, the angle of a side wall of the hollow space of the particle guidance member may be optimized based on the position of the first electrode 1350. For example, when the first electrode 1350 is disposed to the left side of the cell as shown in FIG. 12, the angle of one side wall of the hollow space of the particle guidance member 1330 shown in FIG. 13 may be configured based on the position of the first electrode 1350. When the first electrode 1350 is disposed to the left side, a distance by which the charged particles move to the right boundary of the cell 1290 may be longer than the distance by which the charged particles move to the left boundary of the cell 1290. Accordingly, the angle formed by the right side surface of the hollow space of the particle guidance member 1330 with a substrate may be lower than the configuration where the first electrode 1350 is disposed in the center of the cell 1290, so that the charged particles can easily move to the right boundary of the cell 1290.

Figure 14:
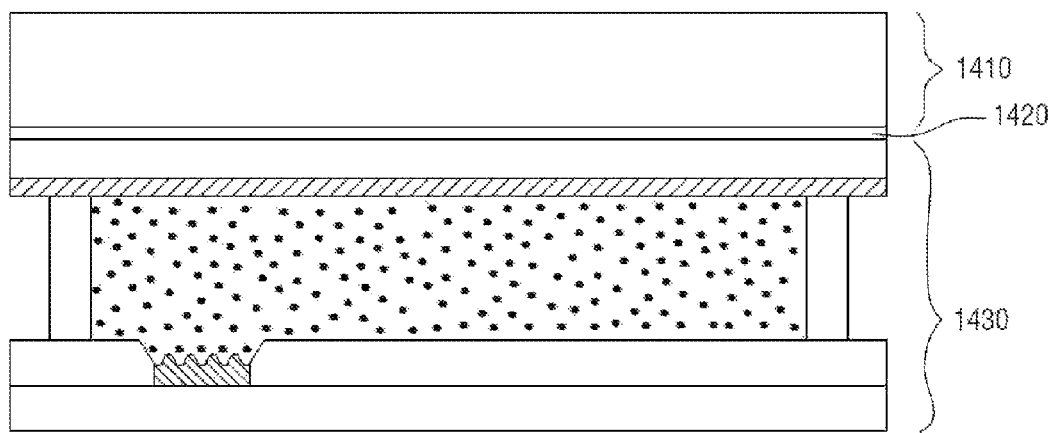
FIG. 14 is a schematic view of an organic light-emitting diode (OLED) display device to which light-controlling devices according to various exemplary embodiments of the present invention may be applied.

FIG. 14 is a schematic diagram of a display device 1400 to which a light-controlling device according to various exemplary embodiments of the present invention may be applied. The display device 1400 may include a transparent organic light-emitting diode (OLED) display device 1410, a transparent adhesive layer 1420, and a light-controlling device 1430.

The transparent OLED display device 1410 may include both a top-emission-type OLED display device and a bottom-emission-type OLED display device.

The top-emission-type OLED display device may be an OLED display device in which light is emitted by an OLED through an upper portion of the OLED display device. Here, the top-emission type may be referred to as a front-emission type or a top-emission type. In the present specification, the bottom-emission-type OLED display device may be an OLED display device in which light is emitted by an OLED through a lower portion of the OLED display device. Here, the bottom-emission type may be referred to as a back-emission type, a rear-emission type, or a bottom-emission type. In the present specification, a dual-emission-type OLED display device may be an OLED display device in which light is emitted by an OLED through upper and lower portions of the OLED display device. The dual-emission-type OLED display device may refer to an OLED display device that may be driven using both a top-emission method and a bottom-emission method.

The OLED display device may include a substrate, a plurality of TFTs, an anode, and (or) an organic emission layer (EML).

The OLED display device may include the TFTs so that the organic EML can emit light. For example, the TFTs may include switching TFTs and driver TFTs. When a scan signal is applied from a gate line, a switching TFT may transmit a data signal received from a data line to a gate electrode of a driver TFT. The driver TFT may supply current received through a power line to the anode in response to the data signal received from the switching TFT, and control an emission operation of an organic EML of the corresponding pixel or sub-pixel in response to the current supplied to the anode.

In FIG. 14, the OLED display device may be a transparent OLED display device 1410. To ensure transmittance of the transparent OLED display device 1410, a substrate, an anode, and a cathode may be formed of a light-transmissive material. Furthermore, the transparent OLED display device 1410 may include an emission unit configured to emit display light, and a transmission unit configured to transmit incident light. In the emission unit, an anode, an OLED, and a cathode may be stacked so that the OLED can emit light. Each of the anode and the cathode may be formed of a light-transmissive material to enable a dual emission operation. Since the light-controlling device of FIG. 14 may be the light-controlling device according to one of the above-described embodiments or another embodiment, a repeated description thereof is omitted.

The light-controlling device 1430 may be adhered to the transparent OLED display device 1410. For instance, the transparent OLED display device 1410 may be disposed on the light-controlling device 1430 using a transparent adhesive or a transparent adhesive layer 1420. FIG. 14 illustrates an example in which the light-controlling device 1430 is disposed at a bottom end of the transparent OLED display device 1410, but the light-controlling device 1430 may be formed on the transparent OLED display device 1410.

When the light-controlling device 1430 is adhered to the transparent OLED display device 1410, the light-controlling device 1430 may be controlled to shield light so that the transparent OLED display device 1410 may increase a contrast ratio during an emission operation. Also, the light-controlling device 1430 may operate in a transparent mode during an OFF operation of the transparent OLED display device 1410 so that an object disposed behind the transparent OLED display device 1410 may be seen.

A light-controlling device according to various exemplary embodiments of the present invention may be used for various applications. For example, the light-controlling device may be used for various display devices, for example, not only an OLED display device but also a liquid crystal display (LCD).

When a light-controlling device according to various exemplary embodiments of the present invention is adhered to a display device, the design of the light-controlling device may be partially modified according to the kind of display device. For example, when the display device is a flexible display device, the display device should be capable of being repetitively bent or folded. Thus, various elements constituting the light-controlling device may also be configured to be easily bent or folded.

When a light-controlling device according to various exemplary embodiments of the present invention is adhered to a display device and used, the design of the light-controlling device may be partially modified in consideration of the articles at which the display device is installed. For example, when the display device is installed at a small-sized device or mobile device, such as a smartphone, a portable phone, a tablet PC, or personal digital assistant (PDA), since the display device may use a self-battery without an external power supply, elements of a light-controlling device may be designed to be fit for a limited battery capacity. Furthermore, when the display device is adhered to and installed at a large-sized device or fixing device, such as a television, a monitor, a screen, or an electric bulletin board, since external power is stably supplied, elements of a light-controlling device may be designed so that the display device can embody high resolution.

When a light-controlling device according to various exemplary embodiments of the present invention is used for a light-controllable window (e.g., smart window), the light-controlling device may include at least a support used for the light-controllable window (e.g., smart window). The support may include any kind of film or layer (e.g., a film, a protection layer, or a protection film) that may be used for the light-controllable window (e.g., smart window).

In addition, the design of the light-controlling device may be partially modified according to a position in which the smart phone is installed. For example, when the light-controlling device is installed in a humid position, such as a restroom, a washbowl, a shower room, or a kitchen, the light-controlling device may be designed to include damp-proof elements.

Furthermore, when the light-controllable window (e.g., smart window) is installed in a position (e.g., a building outer wall, a building glass, or vehicle glass) that may be easily exposed to external shocks, the light-controlling device may be designed to include elements that may easily absorb shock, or be highly resistant to shocks.

Also, when the light-controlling device is used for the light-controllable window (e.g., smart window), various optical films capable of enhancing optical and/or physical properties may be adhered to the light-controlling device. A reflection film, a diffusion film, a prism film, a lens-pattern composite film, a dual-luminance enhancing film, an anti-reflection coating film, an ultraviolet (UV) blocking film, or an infrared (IR) blocking film may be adhered to the light-controlling device to enhance optical and/or physical properties. Based on the enhanced properties, a light-controllable window (e.g., smart window) to which the light-controlling device is adhered, may be used as an automobile window, a smart door, a projection wall, or a smart mirror.

When a light-controlling device according to various exemplary embodiments of the present invention is used for a light-controllable window (e.g., smart window), a house door, or a refrigerator door, the light-controlling device may include an optical sensor or a temperature sensor.

A light-controlling device according to various exemplary embodiments of the present invention is not limited to the above-described various modified examples, and may be applied to various applications. Also, the design of the light-controlling device may be modified in various manners according to the applications.

FIGS. 15A through 15C and 16 are cross-sectional views illustrating processes of a method of manufacturing a light-controlling device according to an exemplary embodiment of the present invention.

Figure 15:
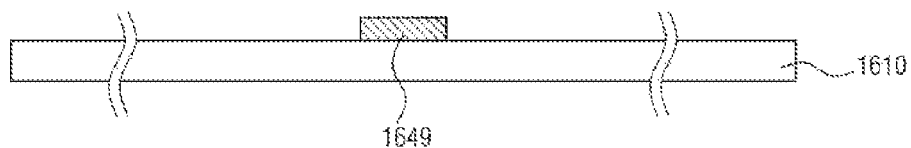
FIGS. 15A, 15B, and 15C, and 16 through 18 are cross-sectional views illustrating processes of a method of manufacturing a light-controlling device according to an exemplary embodiment of the present invention.
Figure 15:
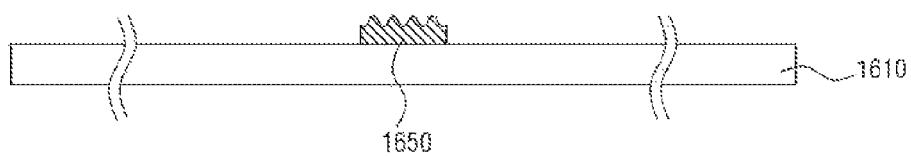
Figure 15:
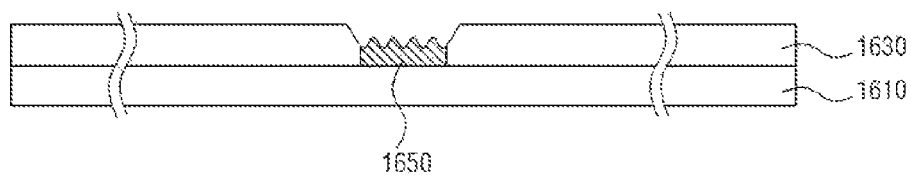

To begin with, referring to FIG. 15A, the first electrode 1650 may be formed on the first substrate 1610. The formation of the first electrode 1650 on the first substrate 1610 may include depositing the electrode 1650 on the entire surface of the first substrate 1610, and selectively patterning the electrode 1650 using a pho115tolithography process.

Referring to FIG. 15B, a plurality of grooves may be formed on the surface of the first electrode 1650. The formation of the plurality of grooves on the surface of the first electrode 1650 may include applying an etching process to the surface of the first electrode 1650. Various etching techniques, such as a dry etching technique or a wet etching technique, may be applied. In some embodiments, the shape of the plurality of grooves formed on the surface of the first electrode 1650 may be controlled by adjusting the kind, concentration, and etch time of an etchant.

Referring to FIG. 15C, the particle guidance member 1630 having a hollow space that exposes at least a portion of the first electrode 1650 may be formed. The formation of the particle guidance member 1630 having the hollow space may include coating positive photoresist on the first substrate 1610 and the first electrode 1650, and exposing and removing a portion of the photoresist in which the first electrode 160 will be exposed. The hollow space having a tapered shape may be formed using the photoresist, and the angle of a side wall of the hollow space may be controlled by adjusting the wavelength of exposure light and a mask.

Figure 16:
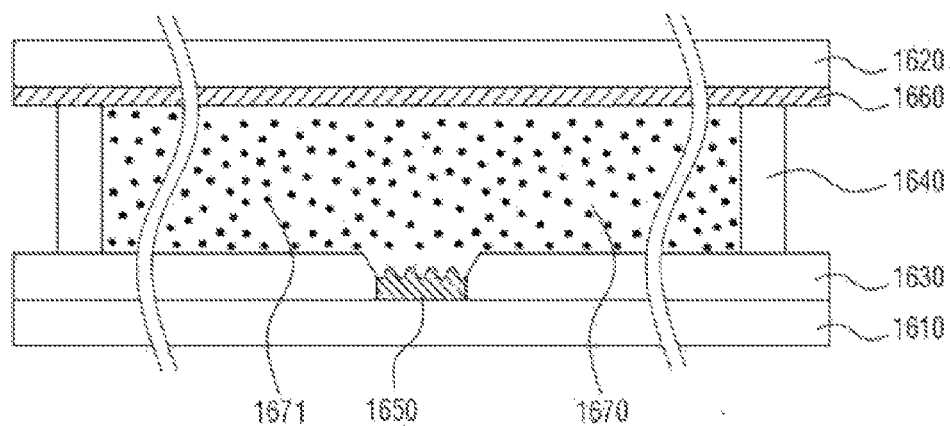

Referring to FIG. 16, a partition wall 1640 may be formed, and the second substrate 1620 having the second electrode 1660 may be bonded to the first substrate 1610 using a sealant. A light-adjustment medium layer 1670 including charged particles may be filled between the first substrate 1610 and the second substrate 1620 due to a capillary phenomenon. After filling the light-adjustment medium layer 1670 including the charged particles, the sealant may be formed to cover the partition wall 1640.

FIGS. 17A through 17C and 18 are cross-sectional views illustrating processes of a method of manufacturing a light-controlling device according to another exemplary embodiment of the present invention.

Figure 17:
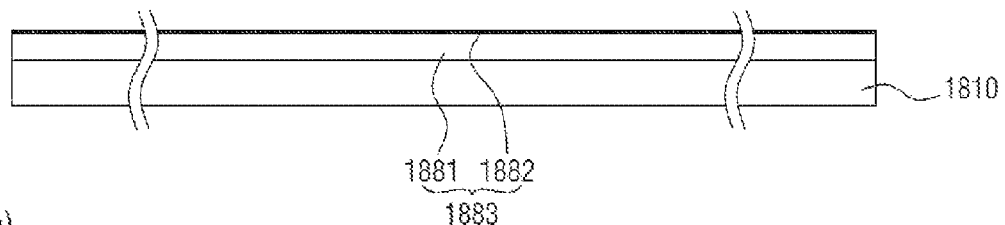
Figure 17:
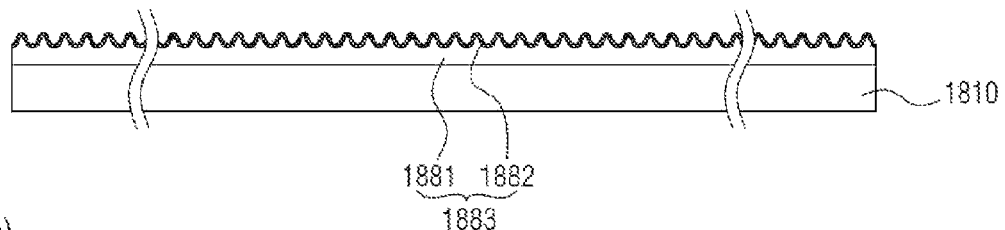
Figure 17:
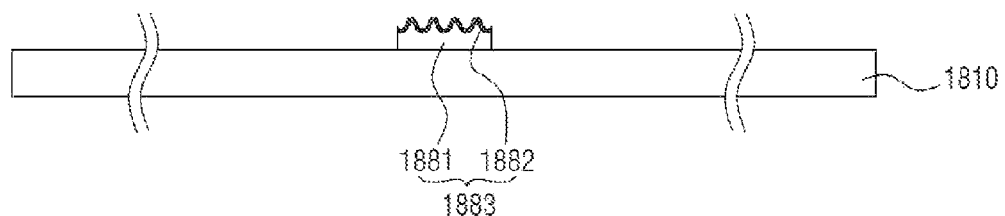

To begin with, referring to FIG. 17A, a polymer layer 1881 and a conductive layer 1882 may be formed on a first substrate 1810. The formation of the polymer layer 1881 may include forming the polymer layer 1881 using a coating process. The formation of the conductive layer 1882 on the polymer layer 1881 may include forming the conductive layer 1882 using a sputtering process. Hereinafter, the polymer layer 1881 and the conductive layer 1882 will be referred to as the first electrode 1883.

Referring to FIG. 17B, a surface of the first electrode 1883 may be formed to include a plurality of grooves.

The formation of the surface of the first electrode 1883 to include the plurality of grooves may include applying heat to the first substrate 1810 and the polymer layer 1881 at a glass transition temperature or higher using an oven or hot plate maintained at a temperature of about 260° C. to about 500° C. to induce phase transition of the polymer layer 1881. The polymer layer 1881 may make a phase transition to a rubber state or fluid state, and a surface of the conductive layer 1882 may be formed to include a buckling structure in accordance to the shape of the polymer layer 1881 due to compression stress.

The formation of the surface of the first electrode 1883 to include the plurality of grooves may include generating heat by supplying current to the conductive layer 1882 to cause the polymer layer to form the buckling structure in a like manner to the above-described heat application method. Referring to FIG. 17C, the first electrode 1883 may be selectively patterned.

Figure 18:
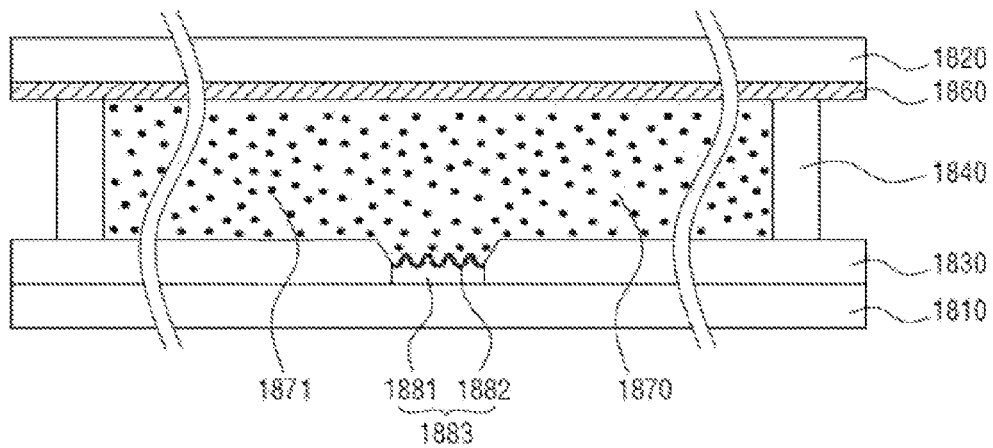

Referring to FIG. 18, a partition wall 1840 may be formed, and a second substrate 1820 having a second electrode 1860 may be bonded to the first substrate 1610 using a sealant. An light-adjustment medium layer 1870 containing charged particles may be filled between the first substrate 1810 and the second substrate 1820 using a capillary phenomenon. After filling the light-adjustment medium layer 1870 containing the charged particles, the sealant may be formed to cover the partition wall 1840.

According to the exemplary embodiments of the present invention, a light-controlling device using charged particles, and a method of manufacturing the same, which may efficiently control movement of the charged particles and maximize transmittance can be provided.

According to the exemplary embodiments of the present invention, providing a light-controlling device using charged particles, and a method of manufacturing the same, which may efficiently control movement of charged particles and maximize a shielding rate and transmittance at the same time can be provided.

The above-described effects according to the exemplary embodiments of the present invention are not intended to limit the contents used herein, and further effects may be encompassed in this specification.

It will be apparent to those skilled in the art that various modifications can be made to the above-described exemplary embodiments of the present invention without departing from the scope of the invention. Thus, it is intended that the present invention covers all such modifications provided they come within the scope of the appended claims and their equivalents.

What is claimed is:

1. A light-controlling device, comprising:
    a first substrate and a second substrate; wherein the first and second substrates are transparent;
    a partition wall separating the first and second substrates to define a cell having an area;
    a light-adjustment medium disposed within the cell between the first and second substrates, the light-adjustment medium containing a plurality of charged particles;
    a first electrode on the first substrate and within the cell; and
    a second electrode on the second substrate and within the cell, wherein the first electrode has a grooved surface with a projection of a first height and a recess with a first depth, wherein a diameter of each charged particle in the plurality of charged particles is less than the first height and less than the first depth of the grooved surface, and wherein light is transmitted through the first substrate and the second substrate when an electric field is applied such that the plurality of charged particles are moved to the first electrode, and wherein the light is shielded when an electric field is applied such that the plurality of charged particles are distributed over the second electrode.

2. The light-controlling device of claim 1, wherein an area of the first substrate covered by the first electrode within the cell is smaller than an area of the second substrate covered by the second electrodes within the cell.

3. The light-controlling device of claim 2, further comprising one or more particle guidance members arranged to form a hollow space over the first electrode exposing at least some portion of the first electrode.

4. The light-controlling device of claim 3, wherein a size of the hollow space is substantially equal to or greater than a total volume of the plurality of charged particles of the light-adjustment medium within the cell.

5. The light-controlling device of claim 3, wherein the hollow space has a tapered shape that narrows down towards the first substrate.

6. The light-controlling device of claim 3, wherein the hollow space has a sidewall extending at an angle of about 40 to about 80 toward the second substrate.

7. The light-controlling device of claim 3, wherein said one or more particle guidance members have a surface sloping towards the hollow space for guiding the plurality of charged particles towards said at least some portion of the first electrode exposed through the hollow space.

8. The light-controlling device of claim 3, wherein said one or more particle guidance members include at least one particle guidance member with a hole through the particle guidance member towards the first electrode forming the hollow space over the first electrode and exposing at least some portion of the first electrode.

9. The light-controlling device of claim 3, wherein said one or more particle guidance members include a first particle guidance member and a second particle guidance member, each having a greater thickness than the first electrode, the first and second particle guidance members being disposed on first and second sides of the first electrode, respectively, and forming the hollow space between the first and second particle guidance members over the first electrode therebetween.

10. The light-controlling device of claim 1, wherein the first electrode within the cell covers about 0.1% to 10% of a total area of the first substrate within the cell.

11. The light-controlling device of claim 1, wherein the plurality of charged particles is one or more materials selected from the group consisting of a plurality of light-absorbing particles, a plurality of light-reflecting particles and a plurality of light-scattering particles.

12. The light-controlling device of claim 11, wherein the first electrode has a grooved surface with a projection of a first height and a recess with a first depth, and wherein a diameter of each of the charged particles is less than the first height and less than the first depth of the grooved surface.

13. The light-controlling device of claim 1, wherein the first electrode is made of a stack of a polymer layer and a conductive layer, and a conductive layer being further away from the first substrate than the polymer layer.

14. The light-controlling device of claim 13, wherein the polymer layer has a thickness of about 10 nm to about 5 μm, and wherein the conductive layer has a thickness of about 10 nm to about 1 μm.

15. A light-controllable window, comprising:
    a collecting electrode disposed on a first transparent substrate;
    a spreading electrode disposed on a second transparent substrate;
    a light-adjustment medium interposed between the first substrate and the second substrate, the light-adjustment medium containing a plurality of electrically charged particles dispersed in a fluid; and
    one or more particle guidance members arranged to form a hollow space enclosing the collecting electrode, the hollow space having an opening towards the light-adjustment medium, wherein the collecting electrode has a grooved surface for increasing a surface area of the collecting electrode without increasing a size of the collecting electrode, wherein light is transmitted through the first transparent substrate and the second transparent substrate when an electric field is applied such that the electrically charged particles are moved to the collecting electrode, and wherein the light is shielded when an electric field is applied such that the charged particles are distributed over the spreading electrode.

16. The light-controllable window of claim 15, wherein an area of the first transparent substrate being covered by the collecting electrode is smaller than an area of the second transparent substrate being covered by the spreading electrode.

17. The light-controllable window of claim 16, further comprising a first insulation layer on the first electrode and a second insulation layer on the second electrode for preventing the electrically charged particles from directly contacting the first and second electrodes.

18. The light-controllable window of claim 17, wherein the collecting electrode has a grooved surface for increasing a surface area of the collecting electrode without increasing a size of the collecting electrode.

19. The light-controllable window of claim 17, wherein the electrically charged particles comprises one or more of a plurality of light-absorbing particles, a plurality of light-reflecting particles and a plurality of light-scattering particles.

20. A method of manufacturing a light-controlling device, comprising:
    forming a first electrode on a first substrate;
    forming a second electrode on a second substrate, the second electrode being larger than the first electrode;
    forming at least one particle guidance member on the first substrate to form a hollow space exposing at least some portion of the first electrode;
    forming a plurality of grooves on a surface of the first electrode by etching process or applying heat to a polymer layer below the first electrode; and
    sealing a light-controlling medium with a plurality of charged particles between the first and the second substrate.

* * * * *